US011415244B2

(12) United States Patent
Di Carlo et al.

(10) Patent No.: US 11,415,244 B2
(45) Date of Patent: Aug. 16, 2022

(54) CONDUITS FOR TRANSPORTING FLUIDS AND METHODS OF FABRICATING THE SAME

(71) Applicant: The Boeing Company, Chicago, IL (US)

(72) Inventors: Tony Di Carlo, Long Beach, CA (US); Brian T. Vaniman, Fountain Valley, CA (US); John P. Leuer, Newport Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/143,888

(22) Filed: Jan. 7, 2021

(65) Prior Publication Data

US 2021/0231235 A1 Jul. 29, 2021

Related U.S. Application Data

(62) Division of application No. 16/228,020, filed on Dec. 20, 2018, now Pat. No. 10,935,167.

(51) Int. Cl.
*F16L 55/02* (2006.01)
*F16L 5/02* (2006.01)
(Continued)

(52) U.S. Cl.
CPC ............. *F16L 5/022* (2013.01); *F16L 27/111* (2013.01); *G01M 3/18* (2013.01); *F16L 2201/30* (2013.01)

(58) Field of Classification Search
CPC ...... F16L 27/111; F16L 2201/30; F16L 51/00; F16L 51/025; F16L 5/022; F16J 15/004;
(Continued)

(56) References Cited

U.S. PATENT DOCUMENTS

| 2,014,355 A | ‡ | 9/1935 | Shikagawa | ........... | G01M 13/00 |
| | | | | | 73/118.01 |
| 3,299,417 A | ‡ | 1/1967 | Sibthorpe | ............. | G01M 3/283 |
| | | | | | 340/605 |

(Continued)

FOREIGN PATENT DOCUMENTS

| EP | 2927471 | ‡ | 7/2015 |
| GB | 954479 | ‡ | 4/1964 |

OTHER PUBLICATIONS

A Practical Guide to Expansion Joints, Expansion Joint Manufacturers Association, Inc., pp. 1-71, Tarrytown, NY. This electronic copyrighted material was made and delivered to the government under license from Expansion Joint Manufacturers Association—No further reproduction is permitted.‡

(Continued)

*Primary Examiner* — Patrick F Brinson
(74) *Attorney, Agent, or Firm* — Kunzler Bean & Adamson

(57) ABSTRACT

A method of fabricating a conduit comprises steps of attaching a first tubular-outboard-ply-end of a tubular outboard ply to a first inner collar portion of a first collar with a second weld and attaching a second tubular-outboard-ply end of the tubular outboard ply to a second inner collar portion of a second collar with a fourth weld. The method also comprises steps of inserting a tubular inboard ply into the tubular outboard ply, threadably interconnecting the first inner collar portion and a first outer collar portion of the first collar, and threadably interconnecting the second inner collar portion and a second outer collar portion of the second collar. The method further comprises steps of attaching a corrugated inboard ply to the first outer collar portion with a first weld and attaching a corrugated inboard ply to the second outer collar portion with a third weld.

20 Claims, 21 Drawing Sheets

(51) Int. Cl.
*F16L 27/111* (2006.01)
*G01M 3/18* (2006.01)

(58) Field of Classification Search
CPC ........ G01M 3/18; G01M 3/182; B21D 15/00; Y10T 29/49877
USPC .......... 138/121, 122, 118, 109, 104; 285/45, 285/226, 227, 299; 73/40.5 R; 72/370.19
See application file for complete search history.

(56) References Cited

U.S. PATENT DOCUMENTS

| | | | | | |
|---|---|---|---|---|---|
| 3,472,062 | A | ‡ | 10/1969 | Owen | G01M 3/3218 73/40.5 R |
| 3,655,224 | A | ‡ | 4/1972 | Carberry | F16L 51/02 285/93 |
| 3,725,565 | A | ‡ | 4/1973 | Schmidt | H01B 12/00 174/13 |
| 3,934,618 | A | ‡ | 1/1976 | Henderson | F16L 9/18 138/114 |
| 4,644,780 | A | ‡ | 2/1987 | Jeter | F16L 55/005 138/104 |
| 4,848,408 | A | ‡ | 7/1989 | Fortmann | F16L 51/025 138/104 |
| 4,854,416 | A | ‡ | 8/1989 | Lalikos | D04C 1/02 181/207 |
| 5,343,738 | A | ‡ | 9/1994 | Skaggs | F16L 11/121 138/113 |
| 5,969,618 | A | ‡ | 10/1999 | Redmond | G01M 3/18 174/11 R |
| 5,992,900 | A | ‡ | 11/1999 | Heller | F16L 27/11 137/12 |
| 8,474,489 | B2 | ‡ | 7/2013 | Gudme | G01M 5/0091 138/104 |
| 8,844,579 | B2 | ‡ | 9/2014 | Eguchi | F16L 11/16 138/121 |
| 9,791,074 | B2 | ‡ | 10/2017 | Hoglund | B01J 8/067 |
| 2005/0242577 | A1 | ‡ | 11/2005 | Baumann | F01N 13/1805 285/226 |
| 2020/0200293 | A1 | ‡ | 6/2020 | Di Carlo | F16L 5/022 |
| 2020/0200295 | A1 | ‡ | 6/2020 | Di Carlo | F16L 13/0209 |
| 2020/0200302 | A1 | ‡ | 6/2020 | Di Carlo | F16L 9/06 |
| 2020/0200318 | A1 | ‡ | 6/2020 | Di Carlo | B21C 3/16 |
| 2020/0200319 | A1 | ‡ | 6/2020 | Di Carlo | G01M 3/04 |
| 2020/0370681 | A1 | | 11/2020 | Di Carlo et al. | |
| 2021/0164592 | A1 | | 6/2021 | Di Carlo et al. | |

OTHER PUBLICATIONS

Extended European Search Report concerning EP Patent Application No. 19195684.6 dated Feb. 17, 2020.‡

U.S. Appl. No. 17/314,602, filed May 7, 2021 with inventors Di Carlo et al.

U.S. Appl. No. 17/143,073, filed Jan. 6, 2021 with inventors Di Carlo et al.

‡ imported from a related application (CONTINUED TO FIG. 13B)

(CONTINUED TO FIG. 13C)

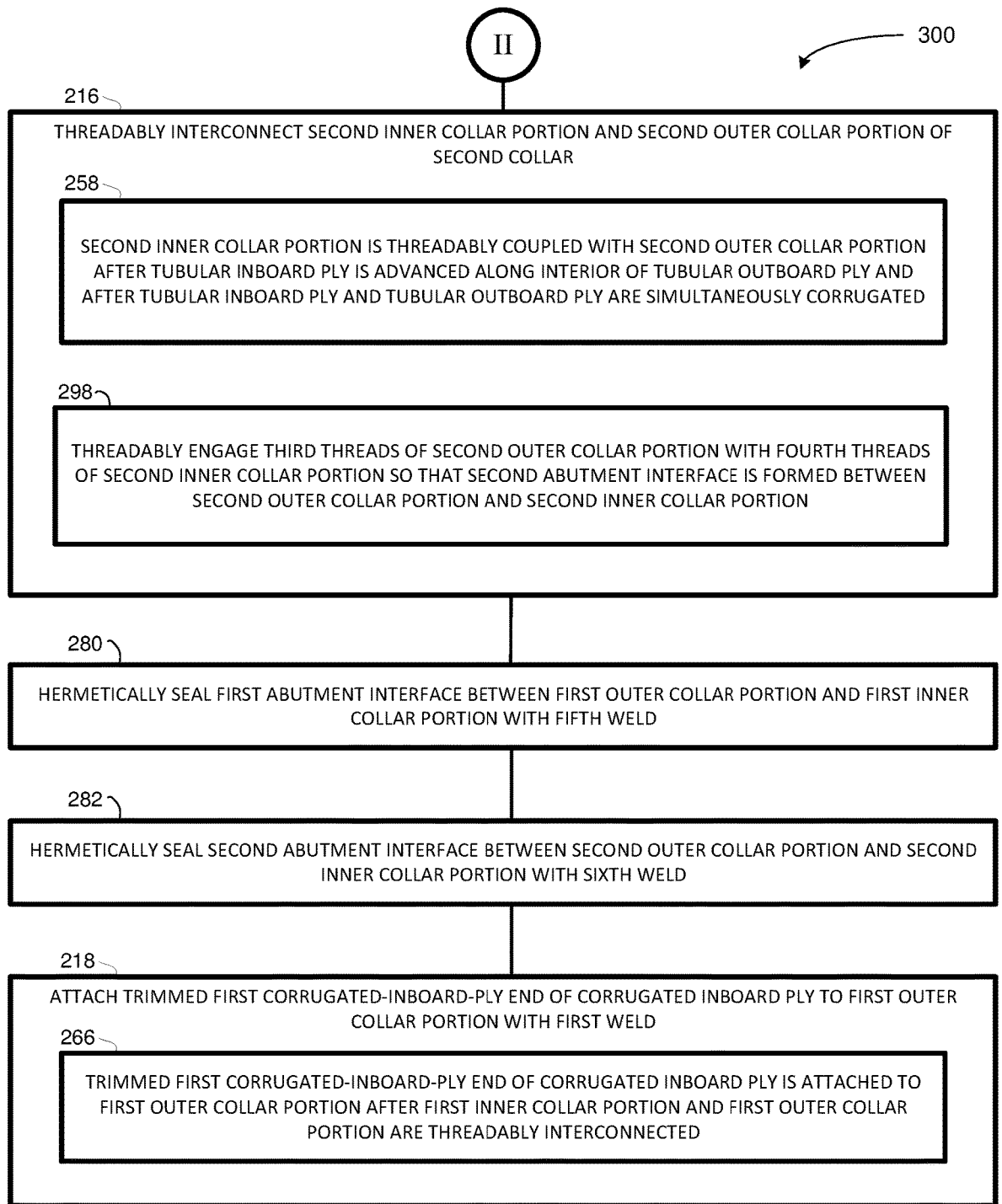

(CONTINUED TO FIG. 13E)

CONDUITS FOR TRANSPORTING FLUIDS AND METHODS OF FABRICATING THE SAME

GOVERNMENT LICENSE RIGHTS

This invention was made with Government support under HR0011-17-9-0001 awarded by Defense Advanced Research Projects Agency. The government has certain rights in this invention.

TECHNICAL FIELD

The present disclosure relates to conduits for transporting fluids and methods of fabricating such conduits

BACKGROUND

Flexible conduits, used in cryogenic propulsion systems, are susceptible to manufacturing variances and incidental damage. If not timely identified, failure of a flexible conduit, such as a pressurized-propellant feed line, could potentially lead to damage of the main propulsion system.

SUMMARY

Accordingly, apparatuses and methods, intended to address at least the above-identified concerns, would find utility.

The following is a non-exhaustive list of examples, which may or may not be claimed, of the subject matter, disclosed herein.

One example of the subject matter, disclosed herein, relates to a conduit for transporting a fluid. The conduit comprises a first collar that comprises a first outer collar portion and a first inner collar portion, threadably coupled with the first outer collar portion. The conduit also comprises a second collar that comprises a second outer collar portion and a second inner collar portion, threadably coupled with the second outer collar portion. The conduit further comprises a bellows that comprises a central axis, a corrugated outboard ply, a corrugated inboard ply, interposed between the corrugated outboard ply and the central axis, and an interstitial space, interposed between the corrugated inboard ply and the corrugated outboard ply. The conduit additionally comprises a first weld, hermetically coupling the corrugated inboard ply and the first outer collar portion. The conduit also comprises a second weld, hermetically coupling the corrugated outboard ply and the first inner collar portion. The conduit further comprises a third weld, hermetically coupling the corrugated inboard ply and the second outer collar portion. The conduit additionally comprises a fourth weld, hermetically coupling the corrugated outboard ply and the second inner collar portion. The conduit also comprises a first sensor, communicatively coupled with the interstitial space.

The conduit provides a compliant structure for transportation of fluids, such as cryogenic fuels, that accommodates displacements encountered during operation. The first sensor, being communicatively coupled with the interstitial space, allows the first sensor to monitor conditions within the interstitial space. In particular, the sensor enables detection of leaks in the corrugated inboard ply by detecting changes in conditions within the interstitial space. The threadable coupling between the first outer collar portion and the first inner collar portion facilitates hermetical coupling of the first outer collar portion and the first inner collar portion while allowing the first outer collar portion to be separately formed from and interconnected to the first inner collar portion, which enables the bellows to be hermetically coupled to the first collar in a simple and efficient manner. Similarly, the threadable coupling between the second outer collar portion and the second inner collar portion facilitates hermetical coupling of the second outer collar portion and the second inner collar portion while allowing the second outer collar portion to be separately formed from and interconnected to the second inner collar portion, which enables the bellows to be hermetically coupled to the second collar in a simple and efficient manner. The first weld promotes a strong, reliable, and sealed connection between the corrugated inboard ply and the first outer collar portion. The second weld promotes a strong, reliable, and sealed connection between the corrugated outboard ply and the first inner collar portion. The third weld promotes a strong, reliable, and sealed connection between the corrugated inboard ply and the second outer collar portion. The fourth weld promotes a strong, reliable, and sealed connection between the corrugated outboard ply and the second inner collar portion. Communicatively coupling the interstitial space with the first sensor allows leaks of fluid or gas into the interstitial space through the corrugated inboard ply to be detected at a location, external to the first collar and the second collar.

Another example of the subject matter, disclosed herein, relates to a conduit for transporting a fluid. The conduit comprises a first collar that comprises a first outer collar portion and a first inner collar portion, threadably coupled with the first outer collar portion. The conduit also comprises a bellows that comprises a central axis, a corrugated outboard ply, a corrugated inboard ply, interposed between the corrugated outboard ply and the central axis, and an interstitial space, interposed between the corrugated inboard ply and the corrugated outboard ply. The conduit further comprises a first weld, hermetically coupling the corrugated inboard ply and the first outer collar portion. The conduit additionally comprises a second weld, hermetically coupling the corrugated outboard ply and the first inner collar portion. The conduit also comprises a first sensor, communicatively coupled with the interstitial space.

The conduit provides a compliant structure for transmission of fluids, such as cryogenic fuels, that accommodates displacements encountered during operation. The first sensor, being communicatively coupled with the interstitial space, allows the first sensor to monitor conditions within the interstitial space. In particular, the first sensor enables detection of leaks in the corrugated inboard ply by detecting changes in conditions within the interstitial space. The threadable coupling between the first outer collar portion and the first inner collar portion facilitates hermetical coupling of the first outer collar portion and the first inner collar portion while allowing the first outer collar portion to be separately formed from and interconnected to the first inner collar portion, which enables the bellows to be hermetically coupled to the first collar in a simple and efficient manner. The first weld promotes a strong, reliable, and sealed connection between the corrugated inboard ply and the first outer collar portion. The second weld promotes a strong, reliable, and sealed connection between the corrugated outboard ply and the first inner collar portion. Communicatively coupling the interstitial space with the first sensor allows leaks of fluid or gas into the interstitial space through the corrugated inboard ply to be detected at a location, external to the first collar.

Another example of the subject matter, disclosed herein, relates to a method of fabricating a conduit. The method comprises attaching a first tubular-outboard-ply end of a tubular outboard ply to a first inner collar portion of a first collar with a second weld. The method also comprises attaching a second tubular-outboard-ply end of the tubular outboard ply, which is axially opposite the first tubular-outboard-ply end of the tubular outboard ply, to a second inner collar portion of a second collar with a fourth weld. The method further comprises inserting a tubular inboard ply into the tubular outboard ply and advancing the tubular inboard ply along an interior of the tubular outboard ply until a first tubular-inboard-ply end of the tubular inboard ply protrudes a first distance past the first inner collar portion, and a second tubular-inboard-ply end protrudes a second distance past the second inner collar portion. The first distance is greater than a first predetermined distance and the second distance is greater than a second predetermined distance. The method additionally comprises simultaneously corrugating the tubular inboard ply and the tubular outboard ply to form a bellows. The bellows has a central axis and comprises a corrugated outboard ply, a corrugated inboard ply, and an interstitial space, interposed between the corrugated inboard ply and the corrugated outboard ply. The corrugated outboard ply is formed from the tubular outboard ply, and the corrugated inboard ply is formed from the tubular inboard ply. The method also comprises trimming a first corrugated-inboard-ply end of the corrugated inboard ply, corresponding to the first tubular-inboard-ply end of the tubular inboard ply, to create a trimmed first corrugated-inboard-ply end that protrudes the first predetermined distance past the first inner collar portion. The method further comprises trimming a second corrugated-inboard-ply end of the corrugated inboard ply, corresponding to the second tubular-inboard-ply end of the tubular inboard ply, to create a trimmed second corrugated-inboard-ply end that protrudes the second predetermined distance past the second inner collar portion. The method additionally comprises threadably interconnecting the first inner collar portion and a first outer collar portion of the first collar. The method also comprises threadably interconnecting the second inner collar portion and a second outer collar portion of the second collar. The method further comprises attaching the trimmed first corrugated-inboard-ply end of the corrugated inboard ply to the first outer collar portion with a first weld. The method additionally comprises attaching the trimmed second corrugated-inboard-ply end of the corrugated inboard ply to the second outer collar portion with a third weld. The method also comprises communicatively coupling a first sensor with the interstitial space.

The method facilitates fabrication of the conduit in an efficient and simple manner. The conduit provides a compliant structure for transmission of fluids, such as cryogenic fuels, that accommodates displacements encountered during operation. The first sensor, being communicatively coupled with the interstitial space, allows the first sensor to monitor conditions within the interstitial space. The threadable coupling between the first outer collar portion and the first inner collar portion facilitates hermetical coupling of the first outer collar portion and the first inner collar portion while allowing the first outer collar portion to be separately formed from and interconnected to the first inner collar portion, which enables the bellows to be hermetically coupled to the first collar in a simple and efficient manner. Similarly, the threadable coupling between the second outer collar portion and the second inner collar portion facilitates hermetical coupling of the second outer collar portion and the second inner collar portion while allowing the second outer collar portion to be separately formed from and interconnected to the second inner collar portion, which enables the bellows to be hermetically coupled to the second collar in a simple and efficient manner. The first weld promotes a strong, reliable, and sealed connection between the corrugated inboard ply and the first outer collar portion. The second weld promotes a strong, reliable, and sealed connection between the corrugated outboard ply and the first inner collar portion. The third weld promotes a strong, reliable, and sealed connection between corrugated the inboard ply and the second outer collar portion. The fourth weld promotes a strong, reliable, and sealed connection between the corrugated outboard ply and the second inner collar portion. Advancing the tubular inboard ply along an interior of the tubular outboard ply until the first tubular-inboard-ply end of the tubular inboard ply protrudes a first distance past the first inner collar portion, and the second tubular-inboard-ply end protrudes a second distance past the second inner collar portion accommodates the reduction in the length of the tubular inboard ply after the tubular inboard ply is corrugated. Trimming the first corrugated-inboard-ply end of the corrugated inboard ply and trimming the second corrugated-inboard-ply end of the corrugated inboard ply promotes achieving a desired length of the corrugated inboard ply after corrugation of the tubular inboard ply. Communicatively coupling the interstitial space with the first sensor allows leaks of fluid or gas into interstitial space the through the corrugated inboard ply to be detected at a location, external to the first collar and the second collar.

BRIEF DESCRIPTION OF THE DRAWINGS

Figure 1A:
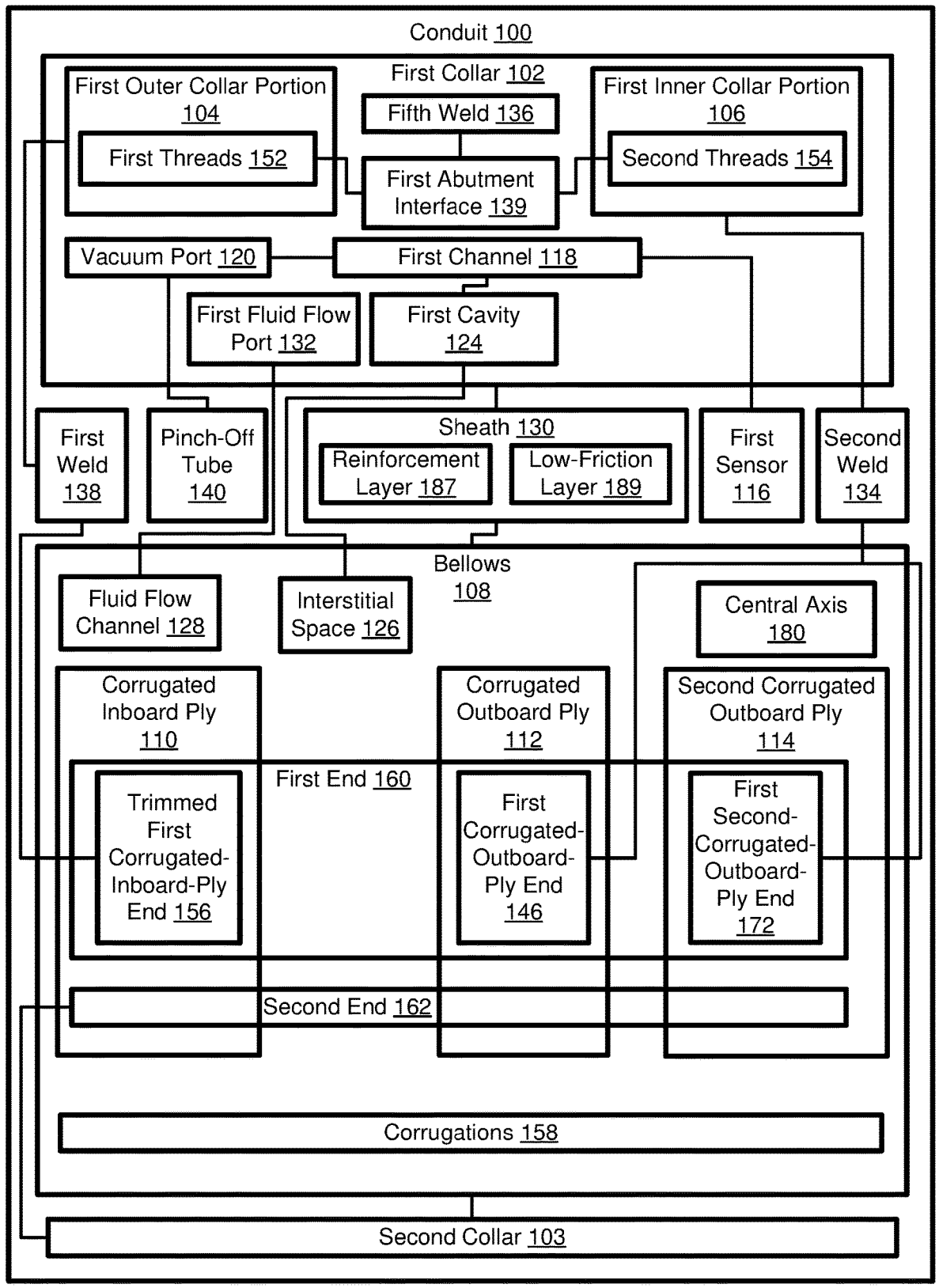
Figure 1B:
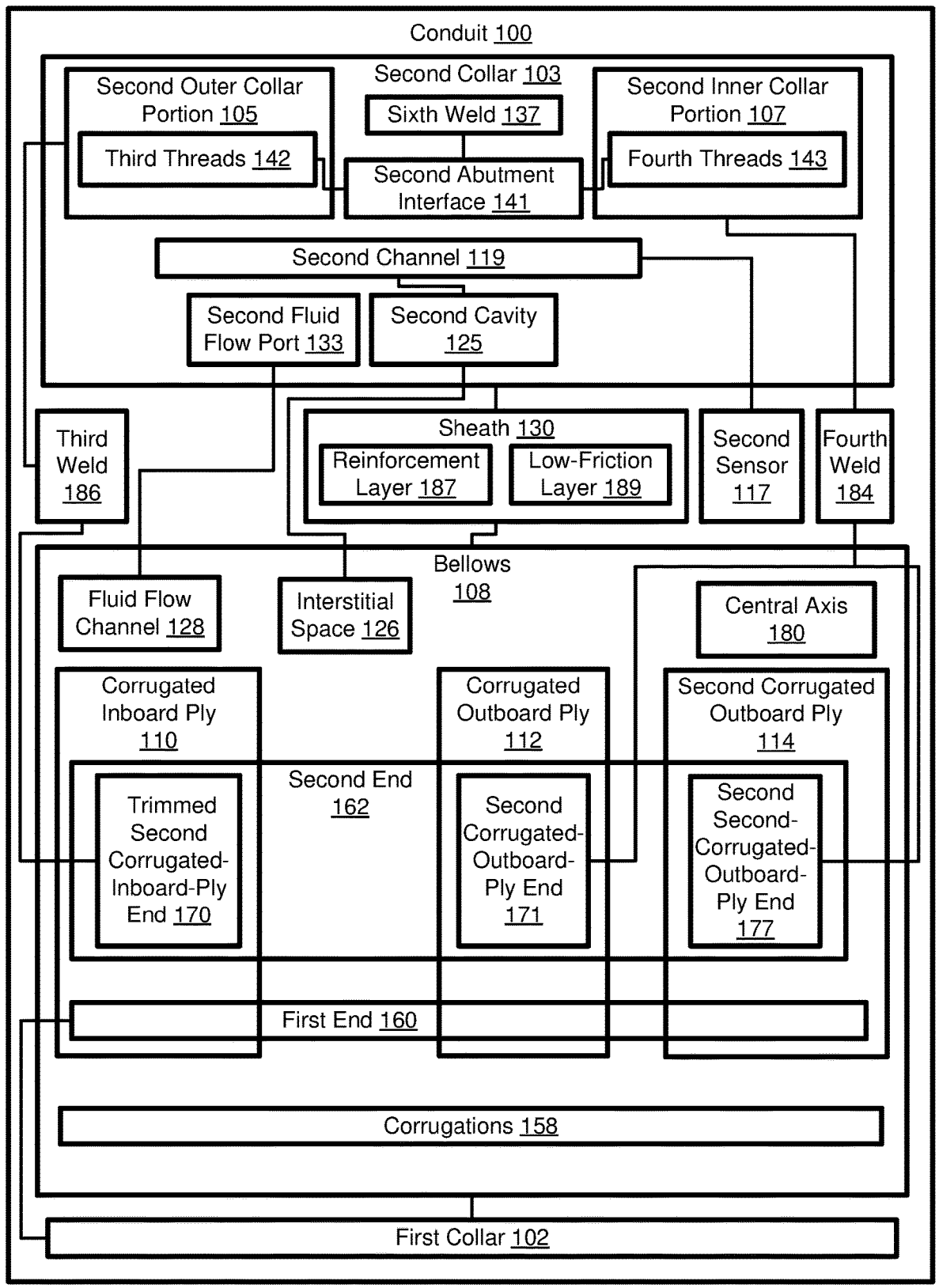
Figure 1C:
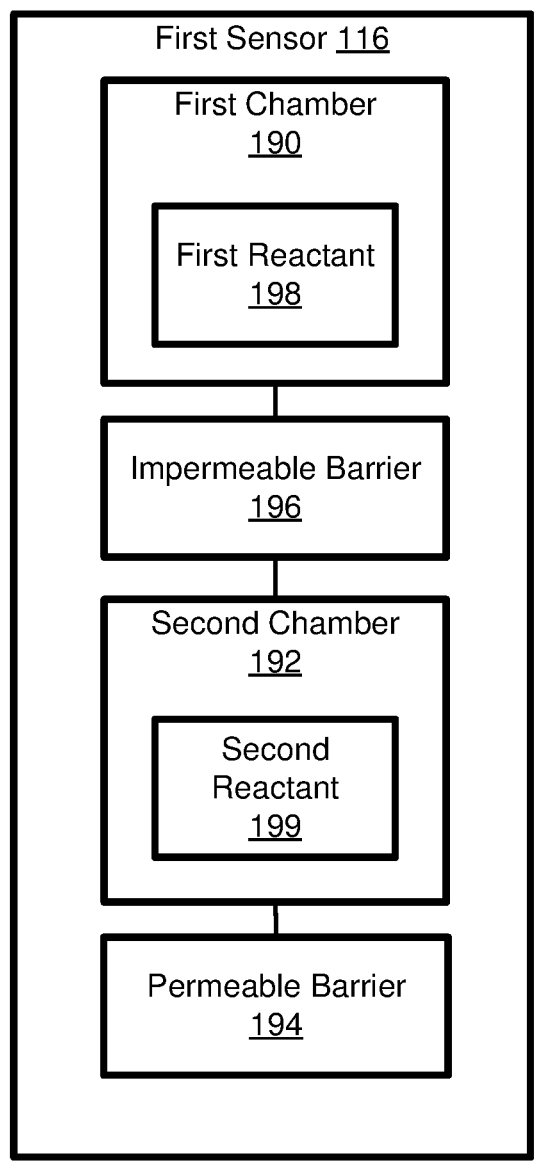
Figure 2:
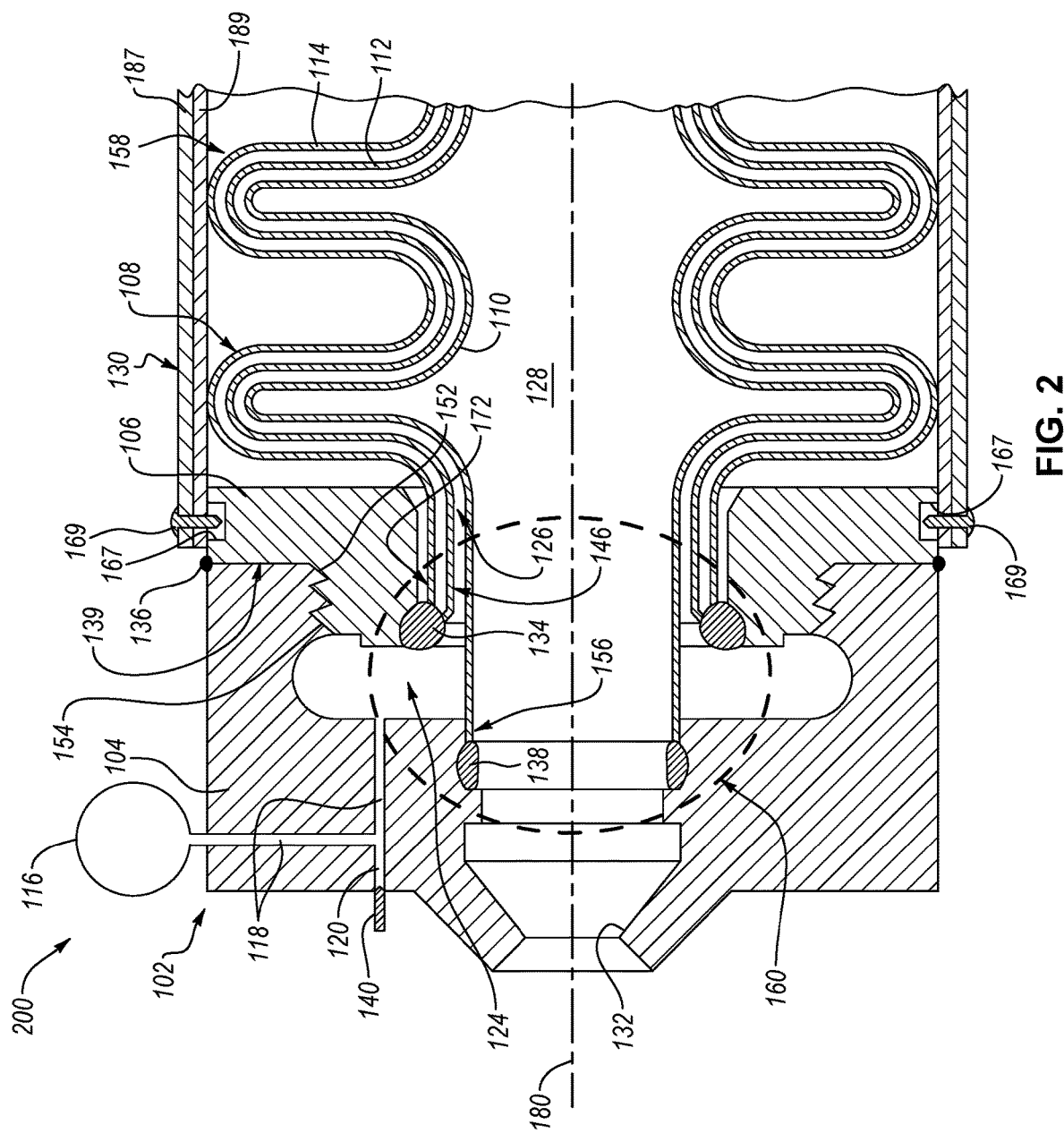
Figure 3:
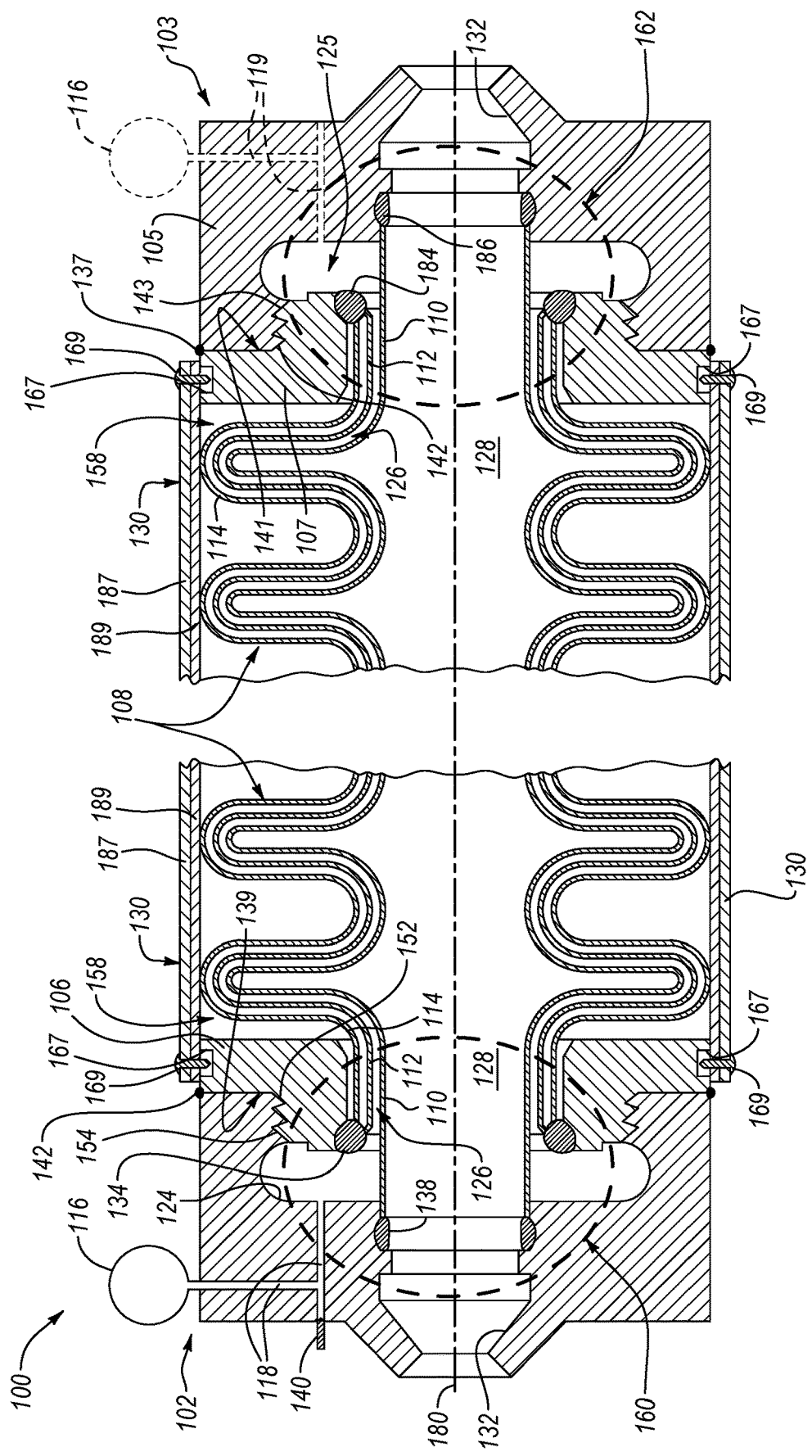
Figure 4:
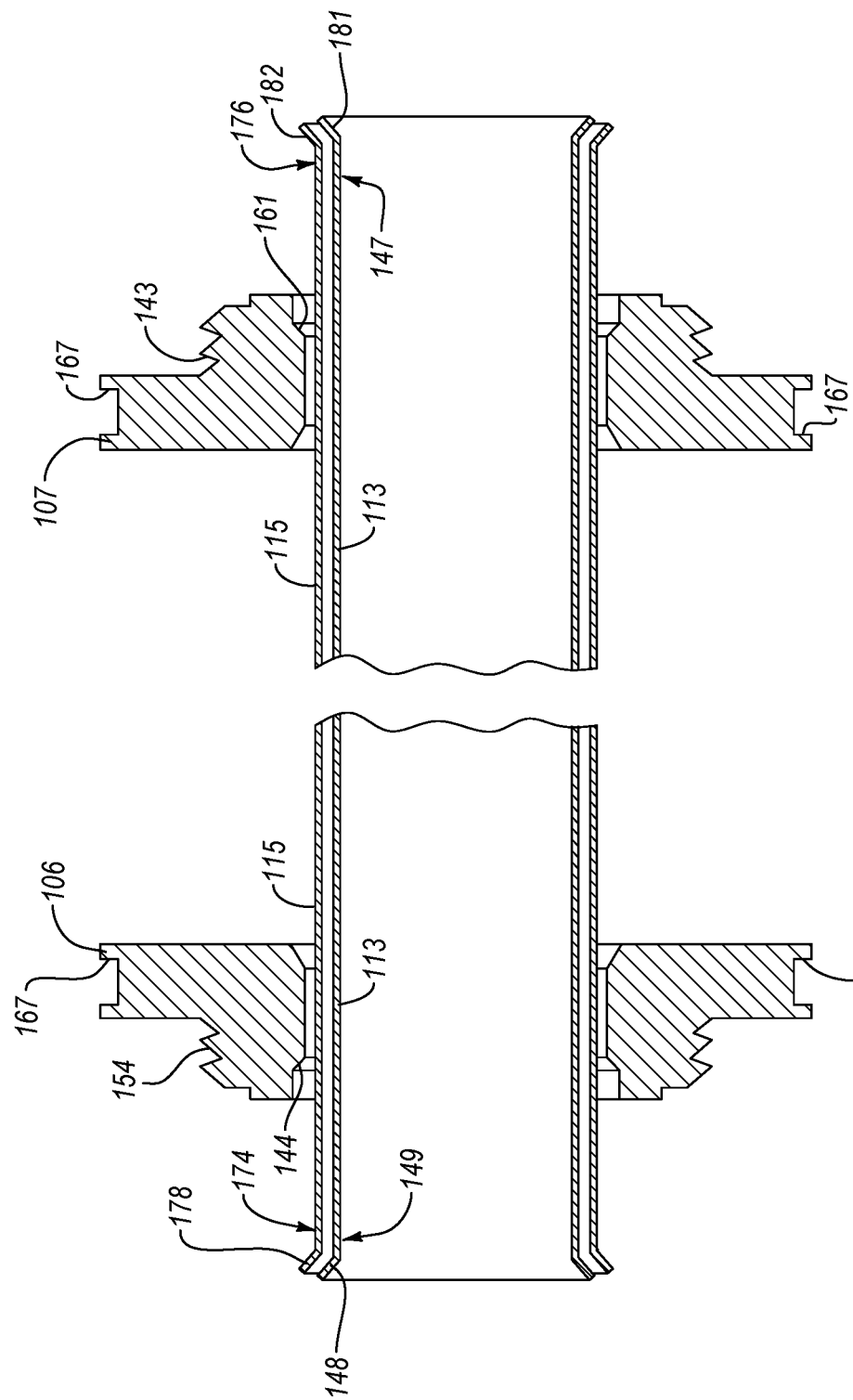
Figure 5:
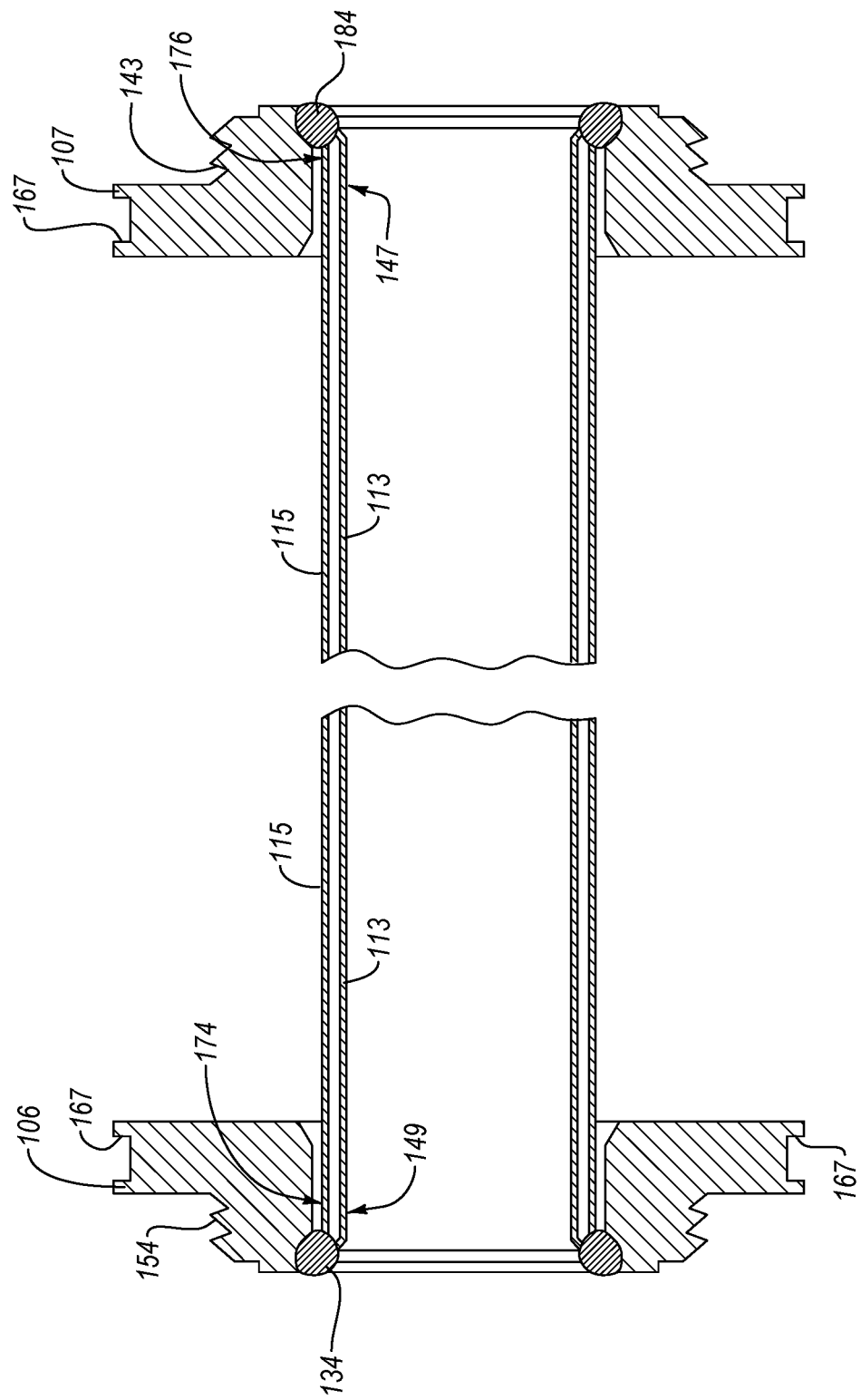
Figure 6:
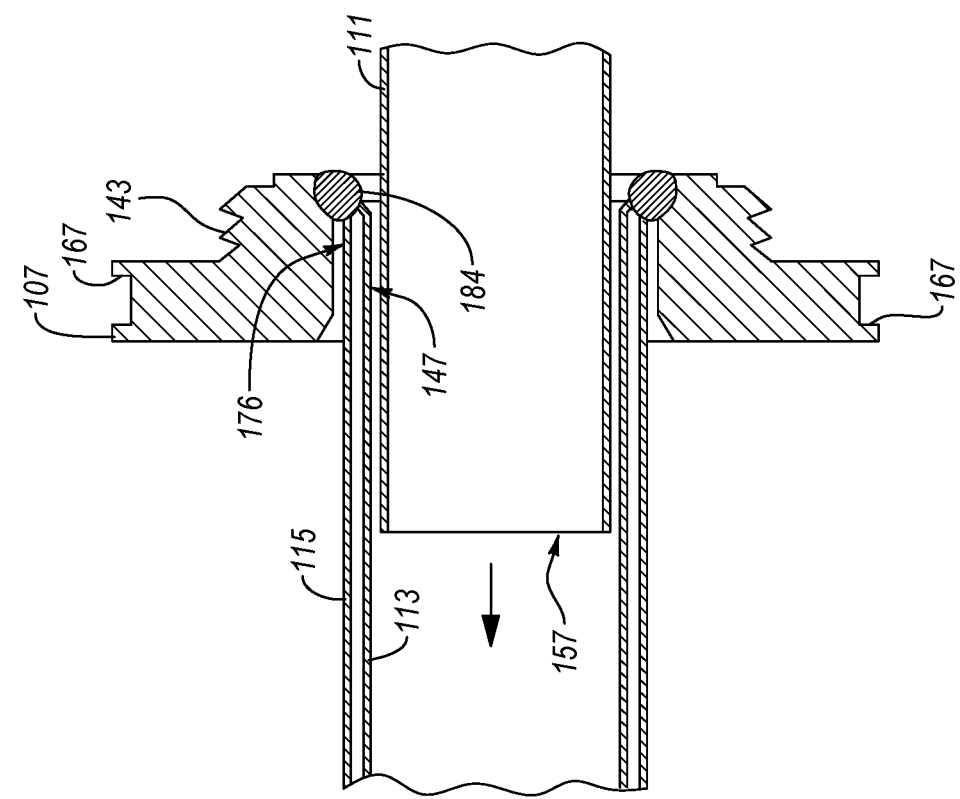
Figure 6:
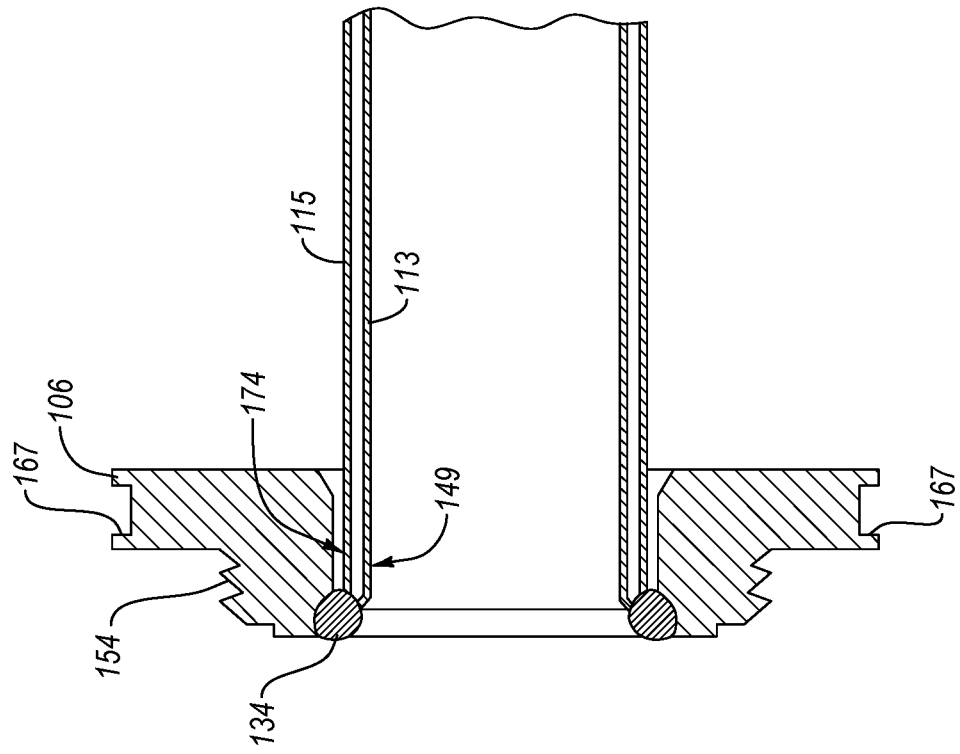
Figure 7:
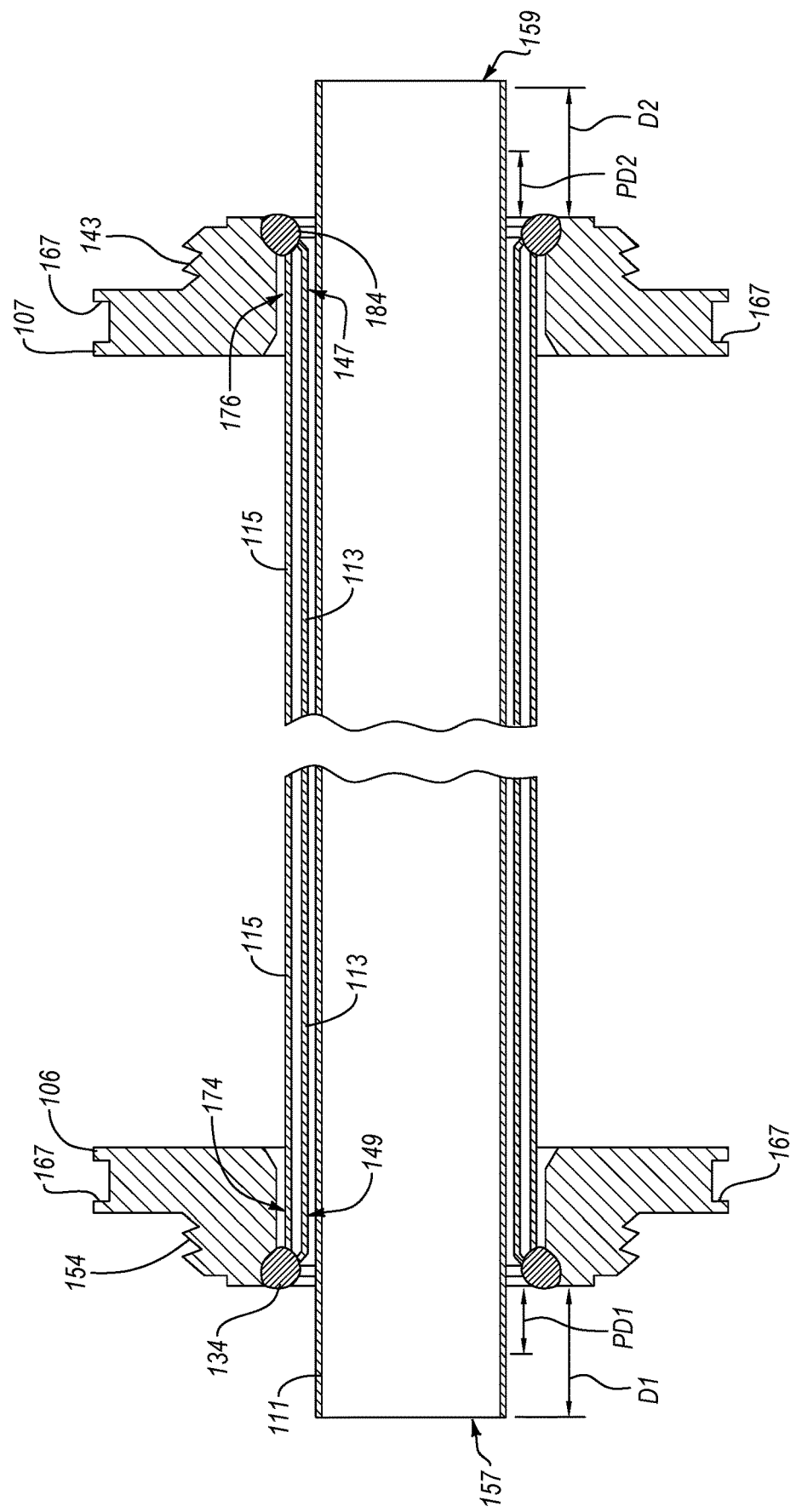
Figure 8:
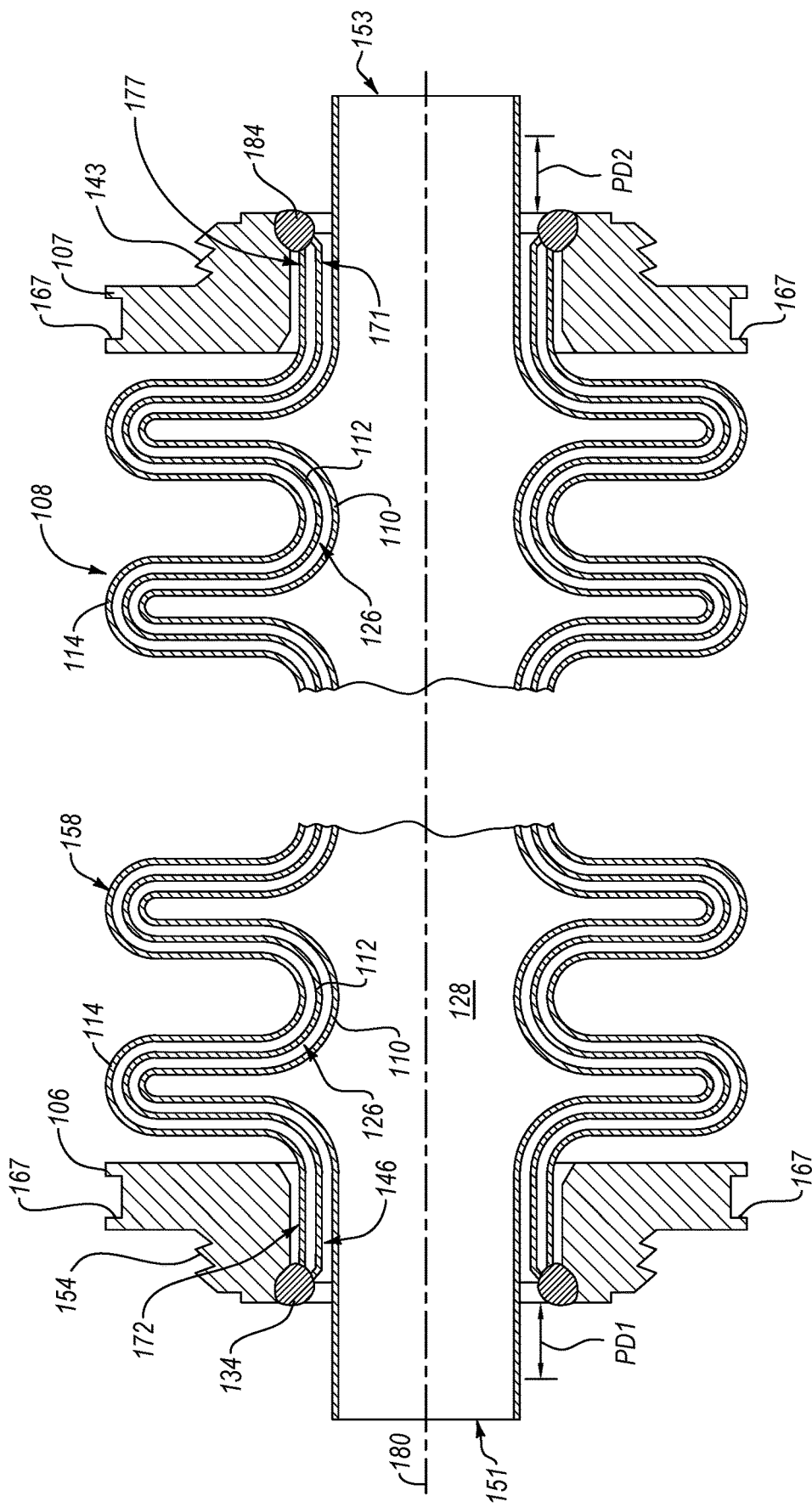
Figure 9:
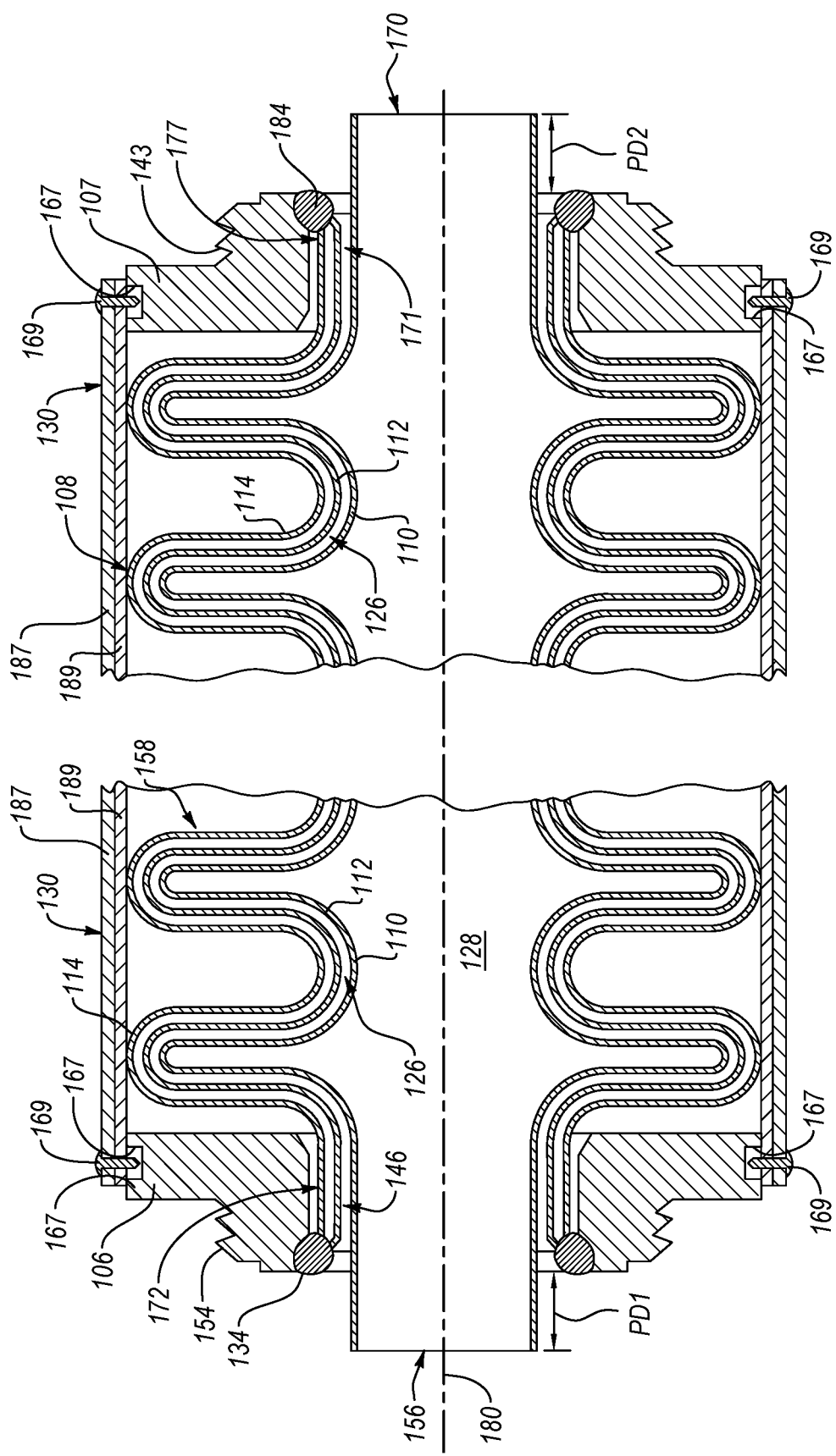
Figure 10:
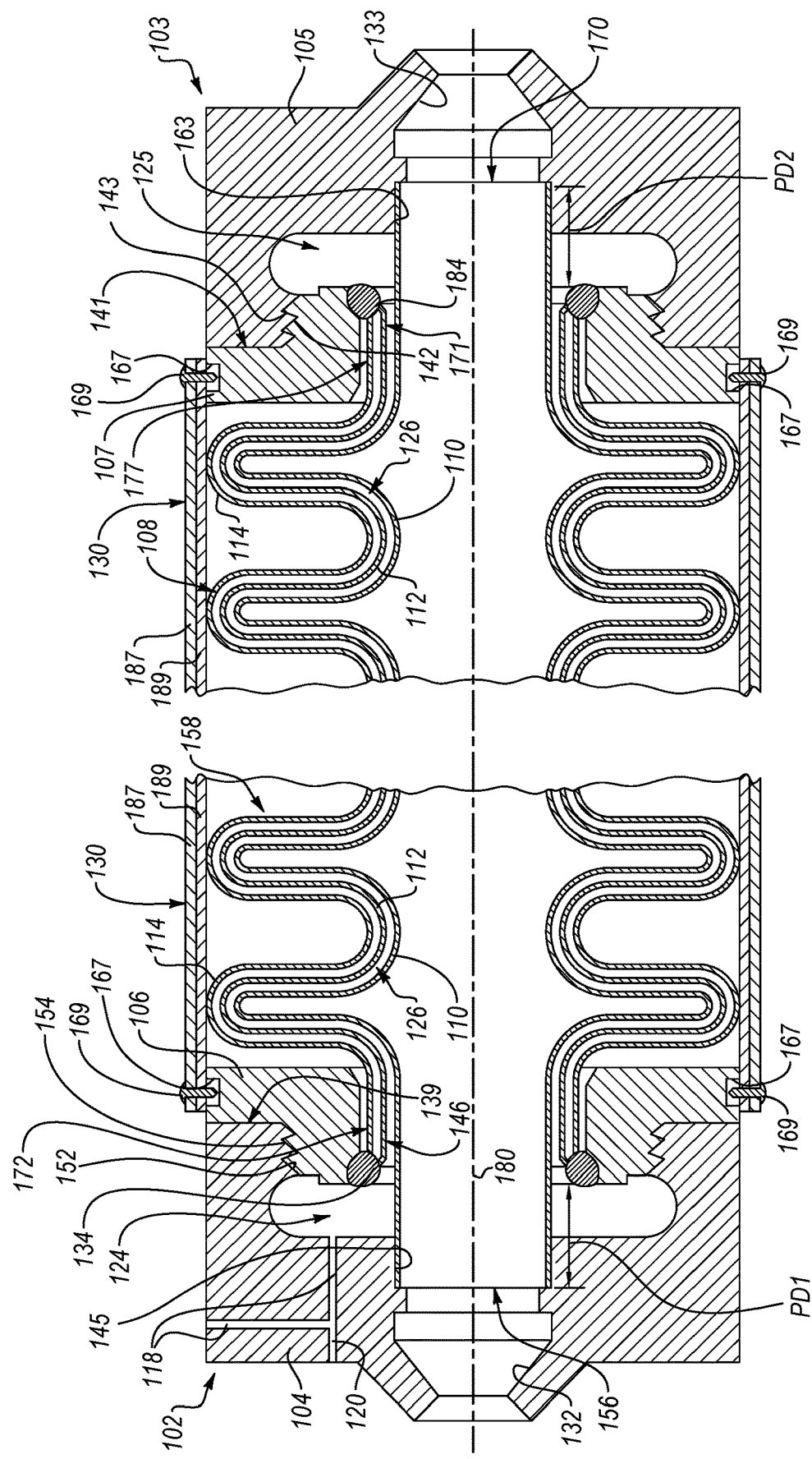
Figure 11:
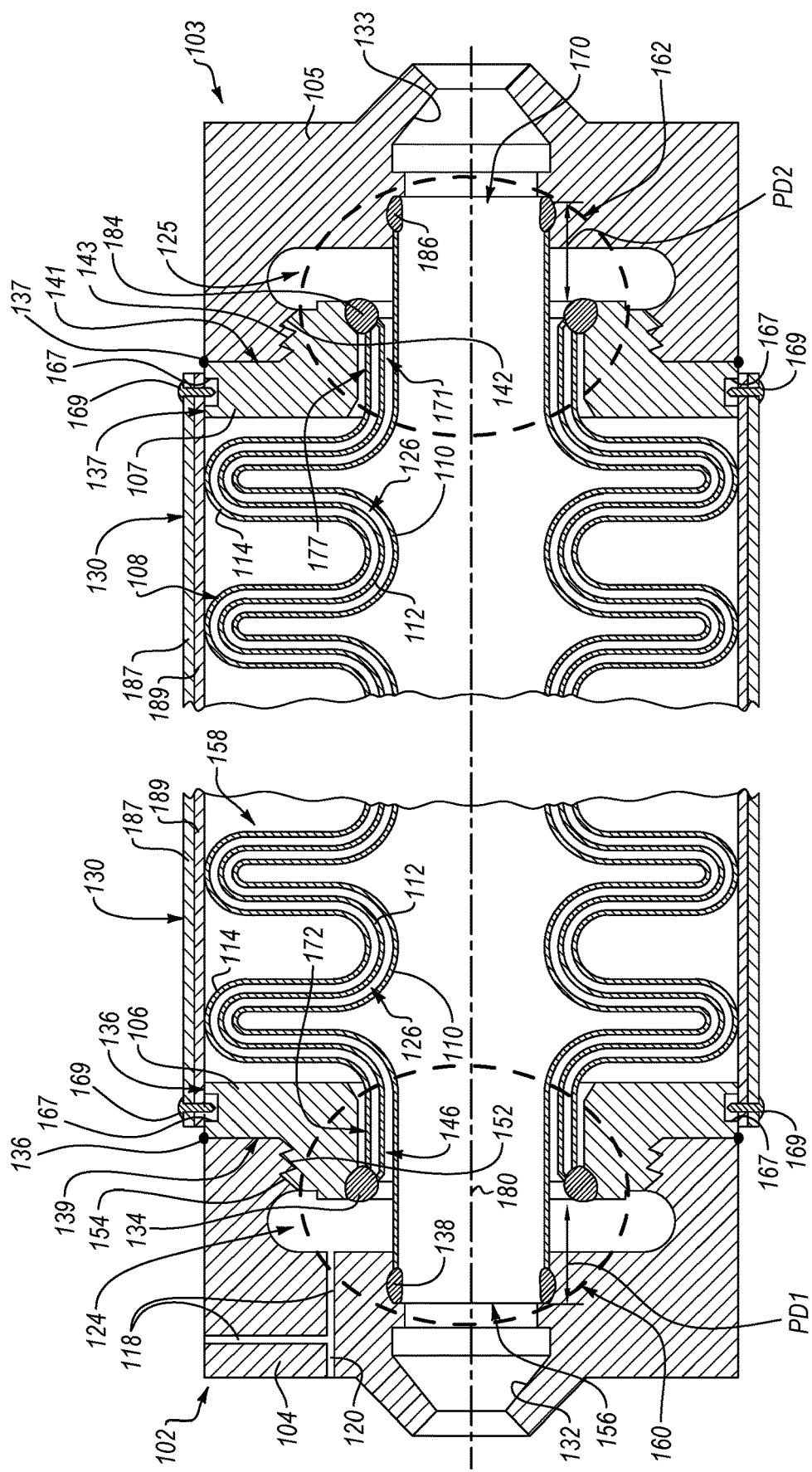
Figure 12:
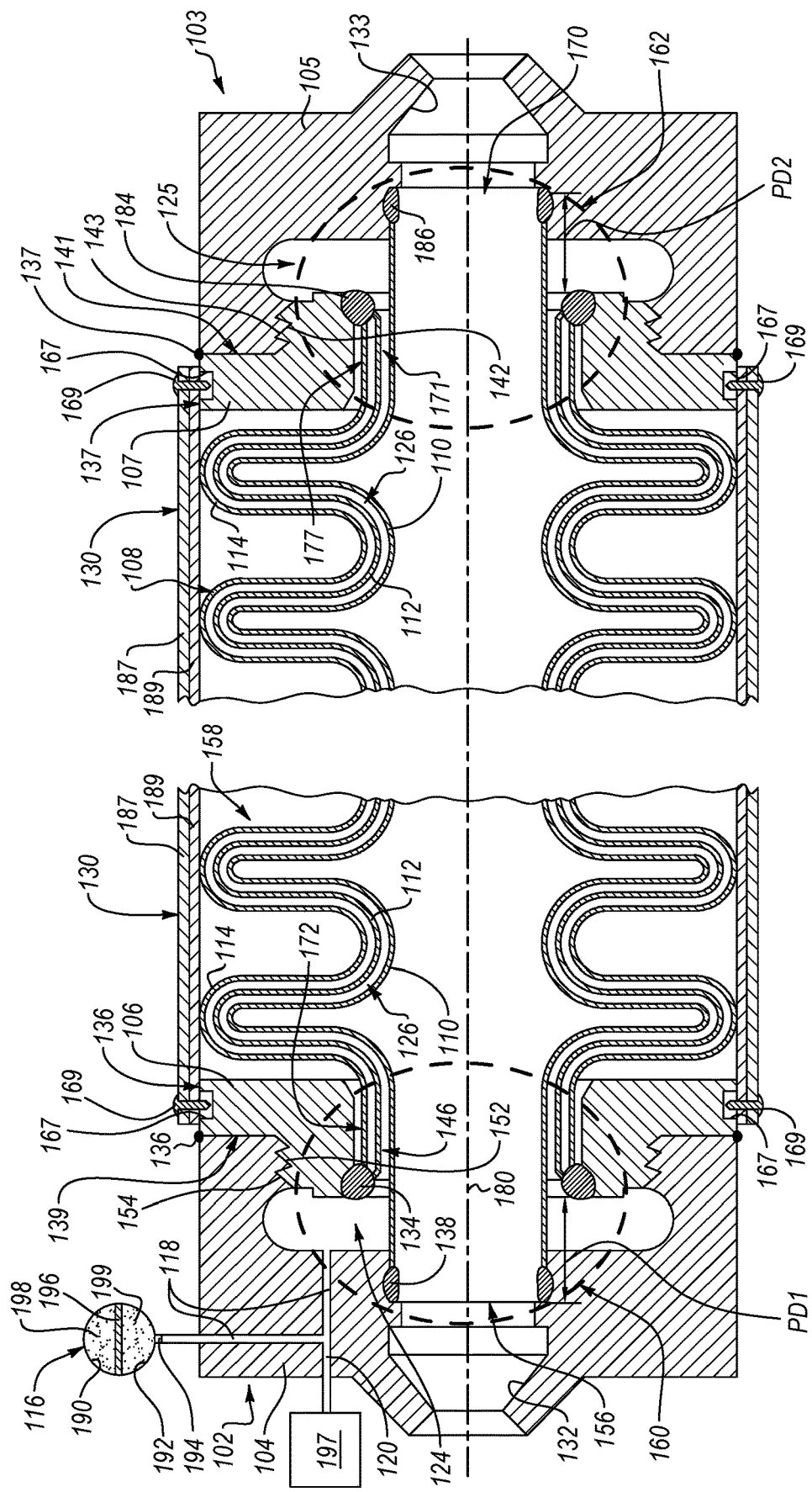
Figure 14:
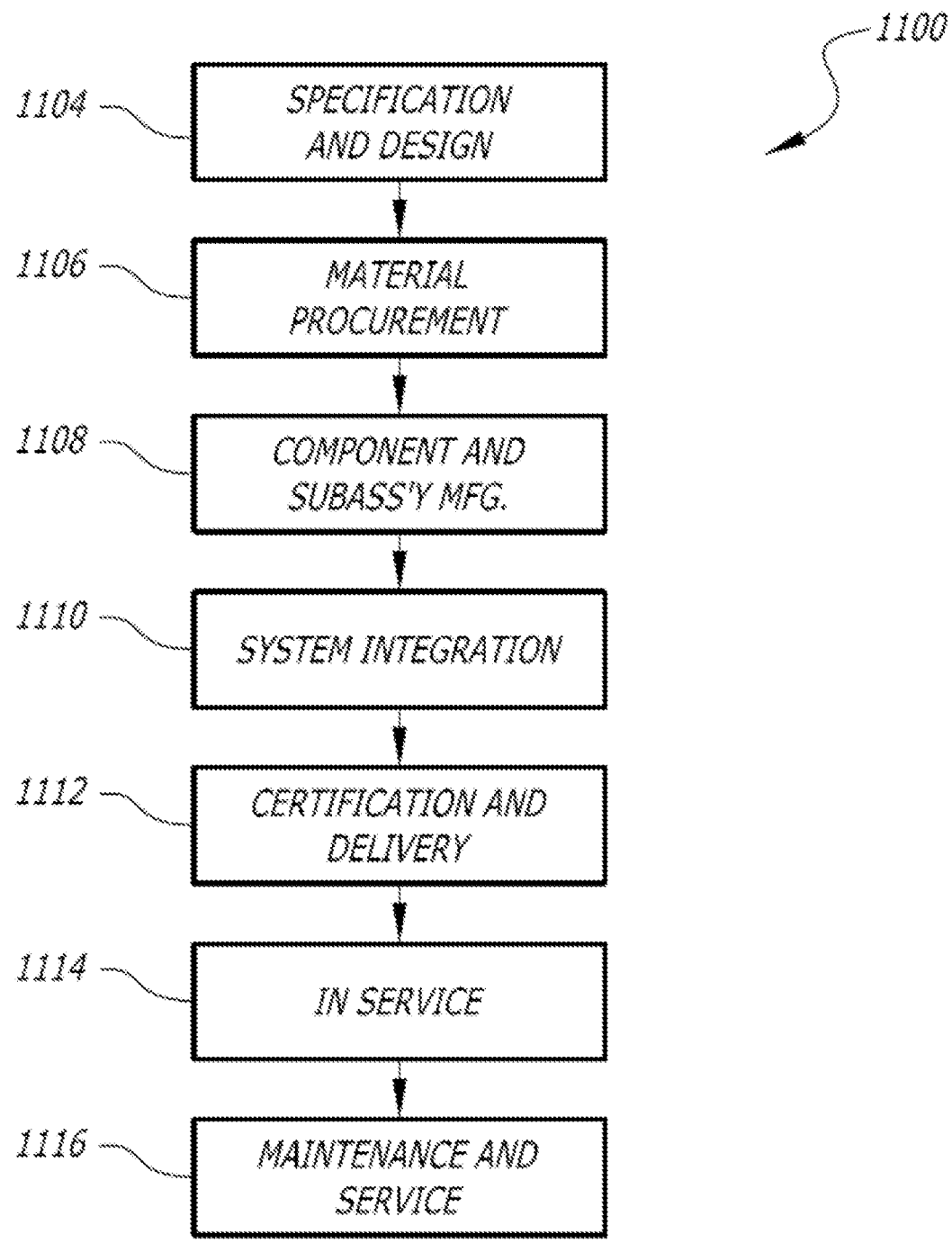
Figure 15:
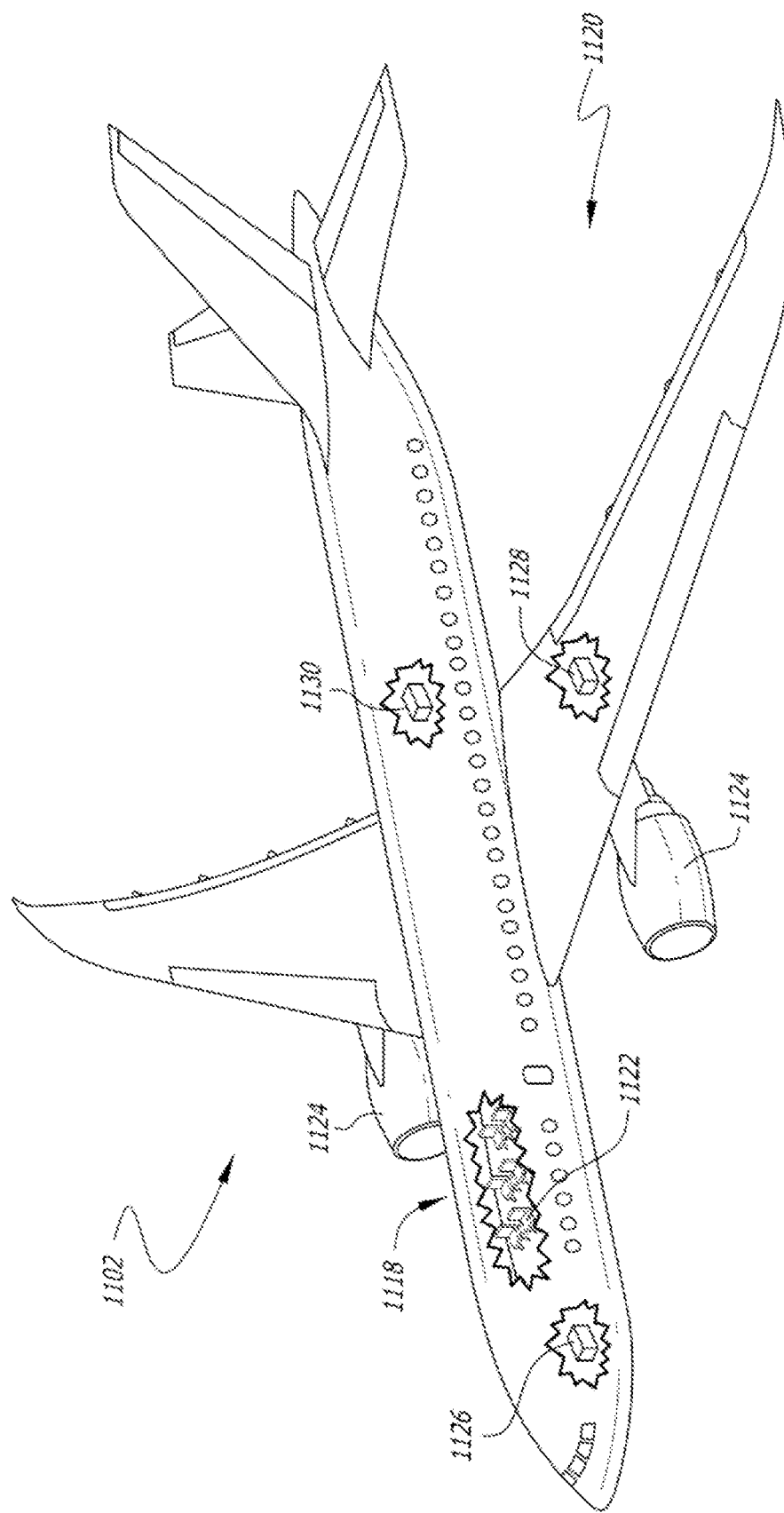

Having thus described one or more examples of the present disclosure in general terms, reference will now be made to the accompanying drawings, which are not necessarily drawn to scale, and wherein like reference characters designate the same or similar parts throughout the several views, and wherein:

FIGS. 1A, 1B, and 1C, collectively, are a block diagram of a conduit for transporting a fluid, according to one or more examples of the present disclosure;

FIG. 2 is a schematic, perspective, sectional view of a first collar portion of the conduit of FIGS. 1A, 1B, and 1C, according to one or more examples of the present disclosure;

FIG. 3 is a schematic, perspective, sectional view of the conduit of FIGS. 1A, 1B, and 1C, according to one or more examples of the present disclosure;

FIG. 4 is a schematic, perspective, sectional view of a sub-assembly of the conduit of FIGS. 1A, 1B, and 1C, according to one or more examples of the present disclosure;

FIG. 5 is a schematic, perspective, sectional view of a sub-assembly of the conduit of FIGS. 1A, 1B, and 1C, according to one or more examples of the present disclosure;

FIG. 6 is a schematic, perspective, sectional view of a sub-assembly of the conduit of FIGS. 1A, 1B, and 1C, according to one or more examples of the present disclosure;

FIG. 7 is a schematic, perspective, sectional view of a sub-assembly of the conduit of FIGS. 1A, 1B, and 1C, according to one or more examples of the present disclosure;

FIG. 8 is a schematic, perspective, sectional view of a sub-assembly of the conduit of FIGS. 1A, 1B, and 1C, according to one or more examples of the present disclosure;

FIG. 9 is a schematic, perspective, sectional view of a sub-assembly of the conduit of FIGS. 1A, 1B, and 1C, according to one or more examples of the present disclosure;

FIG. 10 is a schematic, perspective, sectional view of a sub-assembly of the conduit of FIGS. 1A, 1B, and 1C, according to one or more examples of the present disclosure;

FIG. 11 is a schematic, perspective, sectional view of a sub-assembly of the conduit of FIGS. 1A, 1B, and 1C, according to one or more examples of the present disclosure;

FIG. 12 is a schematic, perspective, sectional view of a sub-assembly of the conduit of FIGS. 1A, 1B, and 1C, according to one or more examples of the present disclosure;

FIGS. 13A-13E, collectively, are a block diagram of a method of fabricating a conduit of FIGS. 1A, 1B, and 1C, according to one or more examples of the present disclosure;

FIG. 14 is a block diagram of aircraft production and service methodology; and FIG. 15 is a schematic illustration of an aircraft.

DETAILED DESCRIPTION

In FIGS. 1A, 1B, and 1C, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1A, 1B, and 1C may be combined in various ways without the need to include other features described in FIGS. 1A, 1B, and 1C, other drawing figures, and/or the accompanying disclosure, even though such combination or combinations are not explicitly illustrated herein. Similarly, additional features not limited to the examples presented, may be combined with some or all of the features shown and described herein.

In FIGS. 13A-13E and 14, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 13A-13E and 14 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIGS. 1A and 1B and particularly to, e.g., FIGS. 2 and 3, conduit 100 for transporting a fluid is disclosed. Conduit 100 comprises first collar 102 that comprises first outer collar portion 104 and first inner collar portion 106, threadably coupled with first outer collar portion 104. Conduit 100 also comprises second collar 103 that comprises second outer collar portion 105 and second inner collar portion 107, threadably coupled with second outer collar portion 105. Conduit 100 further comprises bellows 108 that comprises central axis 180, corrugated outboard ply 112, corrugated inboard ply 110, interposed between corrugated outboard ply 112 and central axis 180, and interstitial space 126, interposed between corrugated inboard ply 110 and corrugated outboard ply 112. Conduit 100 additionally comprises first weld 138, hermetically coupling corrugated inboard ply 110 and first outer collar portion 104. Conduit 100 also comprises second weld 134, hermetically coupling corrugated outboard ply 112 and first inner collar portion 106. Conduit 100 further comprises third weld 186, hermetically coupling corrugated inboard ply 110 and second outer collar portion 105. Conduit 100 additionally comprises fourth weld 184, hermetically coupling corrugated outboard ply 112 and second inner collar portion 107. Conduit 100 also comprises first sensor 116, communicatively coupled with interstitial space 126. The preceding subject matter of this paragraph characterizes example 1 of the present disclosure.

Conduit 100 provides a compliant structure for transportation of fluids, such as cryogenic fuels, that accommodates displacements encountered during operation. First sensor 116, being communicatively coupled with interstitial space 126, allows first sensor 116 to monitor conditions within interstitial space 126. In particular, first sensor 116 enables detection of leaks in corrugated inboard ply 110 by detecting changes in conditions within interstitial space 126. The threadable coupling between first outer collar portion 104 and first inner collar portion 106 facilitates hermetical coupling of first outer collar portion 104 and first inner collar portion 106 while allowing first outer collar portion 104 to be separately formed from and interconnected to first inner collar portion 106, which enables bellows 108 to be hermetically coupled to first collar 102 in a simple and efficient manner. Similarly, the threadable coupling between second outer collar portion 105 and second inner collar portion 107 facilitates hermetical coupling of second outer collar portion 105 and second inner collar portion 107 while allowing second outer collar portion 105 to be separately formed from and interconnected to second inner collar portion 107, which enables bellows 108 to be hermetically coupled to second collar 103 in a simple and efficient manner. First weld 138 promotes a strong, reliable, and sealed connection between corrugated inboard ply 110 and first outer collar portion 104. Second weld 134 promotes a strong, reliable, and sealed connection between corrugated outboard ply 112 and first inner collar portion 106. Third weld 186 promotes a strong, reliable, and sealed connection between corrugated inboard ply 110 and second outer collar portion 105. Fourth weld 184 promotes a strong, reliable, and sealed connection between corrugated outboard ply 112 and second inner collar portion 107. Communicatively coupling interstitial space 126 with first sensor 116 allows leaks of fluid or gas into interstitial space 126 through corrugated inboard ply 110 to be detected at a location, external to first collar 102 and second collar 103.

First weld 138, second weld 134, third weld 186, and fourth weld 184 help to respectively hermetically couple first end 160 of bellows 108 to first collar 102 and second end 162 of bellows 108, which is opposite first end 160 of bellows, to second collar 103. In some examples, each of first weld 138, second weld 134, third weld 186, and fourth weld 184 is a homogenous weld that includes filler material. Homogenous welds are helpful when welding relatively thin parts, such as corrugated inboard ply 110 and corrugated outboard ply 112. In one or more examples, the filler material is a material with properties similar to those of the material of first outer collar portion 104, first inner collar portion 106, second outer collar portion 105, and second inner collar portion 107. According to certain examples, each of first outer collar portion 104, first inner collar portion 106, second outer collar portion 105, second inner collar portion 107, corrugated inboard ply 110, and corrugated outboard ply 112 is made of an austenitic nickel-chromium-based superalloy, such as Inconel®. Each of corrugated inboard ply 110 and corrugated outboard ply 112 has a thickness of about 0.012 inches, in some examples.

According to some examples, one or more of first outer collar portion 104, first inner collar portion 106, second outer collar portion 105, and second inner collar portion 107 is manufactured using subtractive manufacturing techniques, such as machining. In other examples, one or more of first outer collar portion 104, first inner collar portion 106, second outer collar portion 105, and second inner collar portion 107 is manufactured using additive manufacturing techniques. In yet other examples, one or more of first outer collar portion 104, first inner collar portion 106, second outer collar portion 105, and second inner collar portion 107 is manufactured using forging or casting techniques.

In some examples, first collar 102 is different than second collar 103. In one or more examples, first fluid flow port 132 of first collar 102 is of a first type, for fluidly coupling to a first component, and second fluid flow port 133 of second collar 103 is of a second type, for fluidly coupling to a second component, different than the first component. Each of first fluid flow port 132 and second fluid flow port 133 defines an aperture through which fluid flows into or out of conduit 100. In some examples, one of first fluid flow port 132 or second fluid flow port 133 is a nozzle.

Bellows 108 comprises corrugations 158 that help to facilitate compliance of bellows 108. For example, corrugations 158 allow bellows 108 to expand and retract, radially and longitudinally, relative to central axis 180, in response to changes in internal and external conditions relative to conduit 100 (e.g., changes in pressure, temperature, and geometry). Additionally, bellows 108 defines fluid flow channel 128, through which fluid is flowable.

In one or more examples, first sensor 116 is any one of various sensors used to detect the presence of a chemical or a pressure change. In one of more examples, first sensor 116 is one or more of a micro-fuel cell, contactless oxygen sensor spots, oxygen sensor foil, and oxygen probes.

Welds are continuous or annular shaped in one or more examples. Additionally, in one or more example, welds have closed shapes. As used herein, "hermetically coupled with a weld" means the weld is continuous and forms a closed shape.

Referring generally to FIGS. 1A and 1B and particularly to, e.g., FIGS. 2 and 3, at least a part of a portion of corrugated outboard ply 112, proximate second weld 134, is closer to central axis 180 of bellows 108 than second weld 134. At least a part of a portion of corrugated outboard ply 112, proximate fourth weld 184, is closer to central axis 180 of bellows 108 than fourth weld 184. The preceding subject matter of this paragraph characterizes example 2 of the present disclosure, wherein example 2 also includes the subject matter according to example 1, above.

At least part of a portion of corrugated outboard ply 112, proximate second weld 134, being closer to central axis 180 of bellows 108 than second weld 134, ensures second weld 134 does not obstruct interstitial space 126. Similarly, at least part of a portion of corrugated outboard ply 112, proximate fourth weld 184, being closer to central axis 180 of bellows 108 than fourth weld 184, ensures fourth weld 184 does not obstruct interstitial space 126.

Referring generally to FIG. 1A and particularly to, e.g., FIGS. 2 and 3, first collar 102 further comprises first channel 118, passing through one of first outer collar portion 104 or first inner collar portion 106. First channel 118 is cross-sectionally circumferentially closed. First channel 118 is communicatively coupled with interstitial space 126 of bellows 108. First sensor 116 is communicatively coupled with first channel 118 of first collar 102. The preceding subject matter of this paragraph characterizes example 3 of the present disclosure, wherein example 3 also includes the subject matter according to example 1 or 2, above.

Communicatively coupling interstitial space 126 with first sensor 116, via first channel 118 passing through one of first outer collar portion 104 or first inner collar portion 106, allows leaks of fluid or gas into interstitial space 126 through corrugated inboard ply 110 to be detected at any of various locations external to first collar 102, which helps to simplify the assembly and design of first collar 102 of conduit 100.

As defined in relation to first channel 118, which is, for example, a port or a hole, "cross-sectionally circumferentially closed" means that the circumference of any cross-section of first channel 118 that lies in a plane, perpendicular to a central axis of first channel 118, has a closed shape. A closed shape is a space that is fully enclosed by an unbroken line or contour.

Referring generally to FIG. 1A and particularly to, e.g., FIGS. 2 and 3, first channel 118 passes through first outer collar portion 104 of first collar 102. The preceding subject matter of this paragraph characterizes example 4 of the present disclosure, wherein example 4 also includes the subject matter according to example 3, above.

First channel 118, passing through first outer collar portion 104 of first collar 102, allows first sensor 116 to be located on first outer collar portion 104, which helps to free up space on first inner collar portion 106 for attachment of sheath 130.

Referring generally to FIGS. 1A and 1B and particularly to, e.g., FIGS. 2 and 3, the pressure in interstitial space 126 and in first channel 118 is no more than 15 pounds per square inch (psi). The preceding subject matter of this paragraph characterizes example 5 of the present disclosure, wherein example 5 also includes the subject matter according to example 3 or 4, above.

When conduit 100 is used in space, maintaining pressure in interstitial space 126 at or below 15 psi provides controlled separation between corrugated inboard ply 110 and corrugated outboard ply 112, which prevents corrugated inboard ply 110 and corrugated outboard ply 112 from pressing against each other excessively. Preventing corrugated inboard ply 110 and corrugated outboard ply 112 from pressing against each other excessively helps facilitate transfer, to first sensor 116, of any fluid (e.g., propellant) that has leaked into interstitial space 126. Furthermore, controlled separation between corrugated inboard ply 110 and corrugated outboard ply 112 helps to reduce scuffing between corrugated inboard ply 110 and corrugated outboard ply 112. As used herein, pounds per square inch (psi) is absolute pressure.

Referring generally to FIGS. 1A and 1B and particularly to, e.g., FIGS. 2 and 3, the pressure in interstitial space 126 and in first channel 118 is no more than 5 psi. The preceding subject matter of this paragraph characterizes example 6 of the present disclosure, wherein example 6 also includes the subject matter according to example 5, above.

Maintaining pressure in interstitial space 126 at or below 5 psi ensures pressure in interstitial space 126 is not excessive when conduit 100 is used in space. Additionally, providing some pressure at or below 5 psi in interstitial space 126 provides some controlled separation between corrugated inboard ply 110 and corrugated outboard ply 112.

Referring generally to FIGS. 1A and 1B and particularly to, e.g., FIGS. 2 and 3, first collar 102 further comprises first cavity 124, located between first outer collar portion 104 and first inner collar portion 106. Second collar 103 further comprises second cavity 125, located between second outer collar portion 105 and second inner collar portion 107. First channel 118 is communicatively coupled with first cavity 124. First cavity 124 has an annular shape and is communicatively coupled with interstitial space 126. Second cavity 125 has an annular shape and is communicatively coupled with interstitial space 126. The preceding subject matter of this paragraph characterizes example 7 of the present disclosure, wherein example 7 also includes the subject matter according to any one of examples 3 to 6, above.

First cavity 124, having an annular shape and being communicatively coupled with interstitial space 126, and second cavity 125, also having an annular shape and also being communicatively coupled with interstitial space 126, helps to distribute fluid, leaked into interstitial space 126 at any of various locations about a circumference of interstitial space 126, to first channel 118 and first sensor 116. Additionally, first cavity 124 helps to ensure path from interstitial space 126 to first channel 118 is unobstructed.

Referring generally to FIG. 1B and particularly to, e.g., FIG. 3, conduit 100 further comprises second sensor 117. Second collar 103 further comprises second channel 119, passing through one of second outer collar portion 105 or second inner collar portion 107. Second channel 119 is cross-sectionally circumferentially closed. Second channel 119 is communicatively coupled with interstitial space 126 of bellows 108. Second sensor 117 is communicatively coupled with second channel 119 of second collar 103. The preceding subject matter of this paragraph characterizes example 8 of the present disclosure, wherein example 8 also includes the subject matter according to example 7, above.

Communicatively coupling interstitial space 126 with second sensor 117, via second channel 119 passing through one of second outer collar portion 105 or second inner collar portion 107, allows leaks of fluid or gas into interstitial space 126 through corrugated inboard ply 110 to be detected at any of various locations external to second collar 103, which helps to simplify the assembly and design of second collar 103 of conduit 100. Additionally, second sensor 117, being communicatively coupled with interstitial space 126 along with first sensor 116, promotes redundant detection of leakage through corrugated inboard ply 110. In one or more examples, second sensor 117 is able to detect a change in pressure or chemical composition in interstitial space 126 that is not detectable by first sensor 116 for various reasons, such as, for example, fluid or gas leaked from corrugated inboard ply 110 does not reach first sensor 116 or first sensor 116 is disabled.

First sensor 116 is the same type of sensor as second sensor 117 in some examples. In other examples, first sensor 116 is a different type of sensor than second sensor 117. In one or more examples, first sensor 116 detects chemical changes in interstitial space 126, and second sensor 117 detects pressure changes in interstitial space 126, or vice versa. Employing sensors of different types is helpful when a first type of change in interstitial space 126 is undetectable and a second type of change in interstitial space 126 is detectable or is more detectable than the first type of change.

In one or more examples, second sensor 117 is any of various sensors used to detect the presence of a chemical or a pressure change. In one or more examples, second sensor 117 is one or more of a micro-fuel cell, contactless oxygen sensor spots, oxygen sensor foil, and oxygen probes.

Referring generally to FIG. 1B and particularly to, e.g., FIG. 3, second channel 119 passes through second outer collar portion 105 of second collar 103. The preceding subject matter of this paragraph characterizes example 9 of the present disclosure, wherein example 9 also includes the subject matter according to example 8, above.

Second channel 119, passing through second outer collar portion 105 of second collar 103, allows second sensor 117 to be located on second outer collar portion 105, which helps to free up space on second inner collar portion 107 for attachment of sheath 130.

Referring generally to FIG. 1B and particularly to, e.g., FIG. 3, second sensor 117 is configured to detect a pressure change in interstitial space 126. The preceding subject matter of this paragraph characterizes example 10 of the present disclosure, wherein example 10 also includes the subject matter according to example 8 or 9, above.

Pressurized fluid leaking from corrugated inboard ply 110 can cause a change in pressure in interstitial space 126. Second sensor 117, being configured to detect a pressure change in interstitial space 126, allows leakage of fluid from corrugated inboard ply 110 to be detected. Furthermore, second sensor 117, being configured to detect a pressure change in interstitial space 126, is agnostic to the type of fluid transmitted through conduit 100 and leaking from corrugated inboard ply 110, in one or more examples, which helps to increase the versatility of conduit 100.

Referring generally to FIG. 1B and particularly to, e.g., FIG. 3, second sensor 117 is configured to detect a chemical change within interstitial space 126. The preceding subject matter of this paragraph characterizes example 11 of the present disclosure, wherein example 11 also includes the subject matter according to example 8 or 9, above.

In one of more examples, fluid, leaking through corrugated inboard ply 110, causes a change in chemical composition in interstitial space 126 as the fluid enters and occupies interstitial space 126. Second sensor 117, being configured to detect a change in chemical composition in interstitial space 126, allows leakage of fluid from corrugated inboard ply 110 to be detected. Furthermore, second sensor 117, being configured to detect a change in chemical composition in interstitial space 126, is agnostic to the pressure of fluid transmitted through conduit 100 and pressure of fluid in interstitial space 126, in one or more examples, which helps to increase the versatility of conduit 100.

Referring generally to FIGS. 1A and 1B and particularly to, e.g., FIGS. 2 and 3, bellows 108 further comprises second corrugated outboard ply 114. Corrugated outboard ply 112 is interposed between corrugated inboard ply 110 and second corrugated outboard ply 114. Second corrugated outboard ply 114 is hermetically coupled to first inner collar portion 106 by second weld 134 and is hermetically coupled to second inner collar portion 107 by fourth weld 184. The preceding subject matter of this paragraph characterizes example 12 of the present disclosure, wherein example 12 also includes the subject matter according to any one of examples 1 to 11, above.

Second weld 134 promotes a strong, reliable, and sealed connection between corrugated outboard ply 112, second corrugated outboard ply 114, and first inner collar portion 106. Fourth weld 184 promotes a strong, reliable, and sealed connection between corrugated outboard ply 112, second corrugated outboard ply 114, and second inner collar portion 107. Second corrugated outboard ply 114 provides a redundant outboard ply, which, in one or more examples, promotes fault tolerance of conduit 100 by enabling conduit 100 to continue to operate if corrugated outboard ply 112 fails. Additionally, second corrugated outboard ply 114 protects corrugated outboard ply 112 from abrasions caused by objects outboard of corrugated outboard ply 112, such as sheath 130.

Second corrugated outboard ply 114 is made of an austenitic nickel-chromium-based superalloy, such as Inconel®, in some examples. Moreover, in certain examples, second corrugated outboard ply 114 has a thickness of about 0.012 inches.

Each of second weld 134 and fourth weld 184 is a single weld, in one or more examples. In one or more examples, second weld 134 is split up into two separate welds, each attaching a corresponding one of corrugated outboard ply 112 and second corrugated outboard ply 114 to first inner collar portion 106. Similarly, in one or more examples, fourth weld 184 is split up into two separate welds each welding a corresponding one of corrugated outboard ply 112 and second corrugated outboard ply 114 to second inner collar portion 107.

Referring generally to FIGS. 1A and 1B and particularly to, e.g., FIGS. 2 and 3, first weld 138 is offset from second weld 134 along central axis 180 of bellows 108. Third weld 186 is offset from fourth weld 184 along central axis 180 of bellows 108. The preceding subject matter of this paragraph characterizes example 13 of the present disclosure, wherein example 13 also includes the subject matter according to any one of examples 1 to 12, above.

First weld 138, being offset from second weld 134 along central axis 180 of bellows 108, helps to ensure first sensor 116 remains communicatively coupled with interstitial space 126 by ensuring first weld 138 is clear of second weld 134 in axial direction along central axis 180. Third weld 186, being offset from fourth weld 184 along central axis 180 of bellows 108, helps to ensure interstitial space 126 is open to second cavity 125 by ensuring third weld 186 is clear of fourth weld 184 in axial direction along central axis 180.

For purposes of this disclosure, "along" means coincident with or parallel to.

Referring generally to FIGS. 1A and 1B and particularly to, e.g., FIGS. 2 and 3, first weld 138 is offset from second weld 134 along an axis, perpendicular to central axis 180 of bellows 108, and is closer to central axis 180 than second weld 134. Third weld 186 is offset from fourth weld 184 along an axis, perpendicular to central axis 180 of bellows 108, and is closer to central axis 180 than fourth weld 184. The preceding subject matter of this paragraph characterizes example 14 of the present disclosure, wherein example 14 also includes the subject matter according to any one of examples 1 to 13, above.

First weld 138, being offset from second weld 134 along an axis, perpendicular to central axis 180 of bellows 108 and being closer to central axis 180 than second weld 134, helps to ensure first sensor 116 remains communicatively coupled with interstitial space 126 by ensuring first weld 138 is clear of second weld 134 in radial direction relative to central axis 180. Third weld 186, being offset from fourth weld 184 along an axis, perpendicular to central axis 180 of bellows 108 and being closer to central axis 180 than fourth weld 184, helps to ensure interstitial space 126 is open to second cavity 125 by ensuring third weld 186 is clear of fourth weld 184 in radial direction relative to central axis 180.

Referring generally to FIGS. 1A and 1B and particularly to, e.g., FIGS. 2-12, first outer collar portion 104 comprises first threads 152. First inner collar portion 106 comprises second threads 154, threadably engaged with first threads 152 of first outer collar portion 104 so that first abutment interface 139 is formed between first outer collar portion 104 and first inner collar portion 106. Second outer collar portion 105 comprises third threads 142. Second inner collar portion 107 comprises fourth threads 143, threadably engaged with third threads 142 of second outer collar portion 105 so that second abutment interface 141 is formed between second outer collar portion 105 and second inner collar portion 107. The preceding subject matter of this paragraph characterizes example 15 of the present disclosure, wherein example 15 also includes the subject matter according to any one of examples 1 to 14, above.

Threadable engagement between first threads 152 and second threads 154 enables first outer collar portion 104 to be coupled to first inner collar portion 106 in a simple and efficient manner. Similarly, threadable engagement between third threads 142 and fourth threads 143 enables second outer collar portion 105 to be coupled to second inner collar portion 107 in a simple and efficient manner. First abutment interface 139 and second abutment interface 141 promote hermetical coupling of first outer collar portion 104 and first inner collar portion 106, and second outer collar portion 105 and second inner collar portion 107, respectively, at locations away from first threads 152 and second threads 154 and away from third threads 142 and fourth threads 143, which allows hermetical sealing of first outer collar portion 104 and first inner collar portion 106, and second outer collar portion 105 and second inner collar portion 107, to be performed separately from threadably engagement between first outer collar portion 104 and first inner collar portion 106, and second outer collar portion 105 and second inner collar portion 107.

Referring generally to FIGS. 1A and 1B and particularly to, e.g., FIGS. 2, 3, 11, and 12, first collar 102 further comprises fifth weld 136, hermetically coupling first outer collar portion 104 and first inner collar portion 106 along first abutment interface 139 between first outer collar portion 104 and first inner collar portion 106. Second collar 103 further comprises sixth weld 137, hermetically coupling second outer collar portion 105 and second inner collar portion 107 along second abutment interface 141 between second outer collar portion 105 and second inner collar portion 107. The preceding subject matter of this paragraph characterizes example 16 of the present disclosure, wherein example 16 also includes the subject matter according to example 15, above.

Fifth weld 136 enables hermetical coupling of first outer collar portion 104 and first inner collar portion 106. Similarly, sixth weld 137 enables hermetical coupling of second outer collar portion 105 and second inner collar portion 107. First threads 152 and second threads 154 enable a strong mechanical coupling of first outer collar portion 104 and first inner collar portion 106, which allows fifth weld 136 to be configured primarily for hermetical coupling of first outer collar portion 104 and first inner collar portion 106. Accordingly, in one or more examples, fifth weld 136 is relatively smaller, or be of a different type of weld, than a weld for providing the sole mechanical coupling of first outer collar portion 104 and first inner collar portion 106. Third threads 142 and fourth threads 143 enable a strong mechanical coupling of second outer collar portion 105 and second inner collar portion 107, which allows sixth weld 137 to be configured primarily for hermetical coupling of second outer collar portion 105 and second inner collar portion 107. Accordingly, in one or more examples, sixth weld 137 is relatively smaller, or be of a different type of weld, than a weld for providing the sole mechanical coupling of second outer collar portion 105 and second inner collar portion 107. In some examples, each of fifth weld 136 and sixth weld 137 is an autogenous weld.

Referring generally to FIGS. 1A and 1B and particularly to, e.g., FIGS. 2 and 3, conduit 100 further comprises sheath 130 that comprises reinforcement layer 187. Corrugated outboard ply 112 is interposed between sheath 130 and central axis 180. The preceding subject matter of this paragraph characterizes example 17 of the present disclosure, wherein example 17 also includes the subject matter according to any one of examples 1 to 16, above.

Reinforcement layer 187 of sheath 130 helps to protect bellows 108 from external objects.

Referring generally to FIGS. 1A and 1B and particularly to, e.g., FIGS. 2 and 3, sheath 130 is coupled to first inner collar portion 106 of first collar 102 and to second inner collar portion 107 of second collar 103. The preceding subject matter of this paragraph characterizes example 18 of the present disclosure, wherein example 18 also includes the subject matter according to example 17, above.

Coupling sheath 130 to first inner collar portion 106 of first collar 102 and second inner collar portion 107 of second collar 103 ensures entirety of outer periphery of bellows 108 is protected. Additionally, coupling sheath 130 to first inner collar portion 106 of first collar 102 and second inner collar portion 107 of second collar 103 allows sheath 130 to be coupled to first inner collar portion 106 and second inner collar portion 107 before first outer collar portion 104 is hermetically coupled to first inner collar portion 106 by fifth weld 136 and before second outer collar portion 105 is hermetically coupled to second inner collar portion 107 by sixth weld 137.

Referring generally to FIGS. 1A and 1B and particularly to, e.g., FIGS. 2 and 3, sheath 130 is movable relative to first inner collar portion 106 of first collar 102 and relative to second inner collar portion 107 of second collar 103. The preceding subject matter of this paragraph characterizes example 19 of the present disclosure, wherein example 19 also includes the subject matter according to example 18, above.

Sheath 130, being movable relative to first inner collar portion 106 of first collar 102 and relative to second inner collar portion 107 of second collar 103, facilitates compliance of sheath 130 relative to bellows 108 by allowing sheath 130 to move with bellows 108 during use of conduit 100.

Referring generally to FIGS. 1A and 1B and particularly to, e.g., FIGS. 2 and 3, sheath 130 is translatable along central axis 180 relative to first inner collar portion 106 of first collar 102 and relative to second inner collar portion 107 of second collar 103. The preceding subject matter of this paragraph characterizes example 20 of the present disclosure, wherein example 20 also includes the subject matter according to example 19, above.

Sheath 130, being translatable along central axis 180 relative to first inner collar portion 106 of first collar 102 and relative to second inner collar portion 107 of second collar 103, accommodates lengthening (e.g., expansion) and shortening (e.g., contraction) of bellows 108 during use of conduit 100.

In some examples, sheath 130 is coupled to each of first inner collar portion 106 and second inner collar portion 107 by pins 169 engaged with slots 167 formed in first inner collar portion 106 and second inner collar portion 107. Each one of slots 167 is elongated along central axis 180. Each pin 169 passes through a corresponding end of sheath 130 and passes into a corresponding one of slots 167. Sheath 130 is non-movably fixed to pins 169, but each pin 169 is allowed to translatably move along the corresponding one of slots 167, which facilitates translational movement of sheath 130 along central axis 180 relative to first inner collar portion 106 and second inner collar portion 107. According to one example, each one of slots 167 has a width, substantially equal to a width of pins 169, which prevents pins 169, and thus sheath 130, from rotating about central axis 180 relative to first inner collar portion 106 and second inner collar portion 107.

Referring generally to FIGS. 1A and 1B and particularly to, e.g., FIGS. 2 and 3, sheath 130 is rotatable about central axis 180 relative to first inner collar portion 106 of first collar 102 and relative to second inner collar portion 107 of second collar 103. The preceding subject matter of this paragraph characterizes example 21 of the present disclosure, wherein example 21 also includes the subject matter according to example 19 or 20, above.

Sheath 130, being rotatable about central axis 180 relative to first inner collar portion 106 of first collar 102 and relative to second inner collar portion 107 of second collar 103, accommodates rotation of bellows 108 about central axis 180 during use of conduit 100.

In some examples, slots 167 formed in first inner collar portion 106 and second inner collar portion 107, are at least partially annular. Accordingly, pins 169, when engaged with slots 167, are allowed to move translatably along slots 167 in a circumferential direction relative to first inner collar portion 106 and second inner collar portion 107. Such movement of pins 169 within slots 167 facilitates rotational movement of sheath 130 about central axis 180 relative to first inner collar portion 106 and second inner collar portion 107. According to one example, each one of slots 167 has a width that is substantially equal to a width of each one of pins 169, which prevents pins 169, and thus sheath 130, from translating along central axis 180 relative to first inner collar portion 106 and second inner collar portion 107. However, in at least one other example, each one of slots 167 has a width that is greater than the width of each one of pins 169. Each one of slots 167, having a width that is greater than the width of each one of pins 169, accommodates both rotational movement of sheath 130 about central axis 180 relative to first inner collar portion 106 and second inner collar portion 107 and translational movement of sheath 130 along central axis 180 relative to first inner collar portion 106 and second inner collar portion 107.

Referring generally to FIGS. 1A and 1B and particularly to, e.g., FIGS. 2 and 3, sheath 130 further comprises low-friction layer 189, interposed between reinforcement layer 187 of sheath 130 and corrugated outboard ply 112 of bellows 108. Low-friction layer 189 of sheath 130 has a surface roughness lower than that of reinforcement layer 187 of sheath 130. The preceding subject matter of this paragraph characterizes example 22 of the present disclosure, wherein example 22 also includes the subject matter according to any one of examples 17 to 21, above.

Low-friction layer 189 of sheath 130 helps to reduce abrasions between reinforcement layer 187 and bellows 108, particularly when bellows 108 moves relative to sheath 130.

According to some examples, the surface roughness of low-friction layer 189 corresponds with a coefficient-of-friction of the low-friction layer 189 between 0.05 and 0.1, and the surface roughness of reinforcement layer 187 corresponds with a coefficient-of-friction that is higher than that of low-friction layer 189. Low-friction layer 189 of sheath 130 is made of a low-friction material, such as polytetrafluoroethylene, Nylon®, Teflon®, and the like, in some examples. Reinforcement layer 187 is made of a high-abrasion-resistance material, such as fiberglass, aramid, stainless steel (mesh), in certain examples.

Referring generally to FIGS. 1A and 1B and particularly to, e.g., FIGS. 2 and 3, low-friction layer 189 of sheath 130 is in contact with corrugated outboard ply 112 of bellows 108. The preceding subject matter of this paragraph characterizes example 23 of the present disclosure, wherein example 23 also includes the subject matter according to example 22, above.

Low-friction layer 189 of sheath 130, being in contact with corrugated outboard ply 112, ensures that the outside diameter of sheath 130 is as small as possible for use in confined spaces.

Referring generally to FIGS. 1A and 1B and particularly to, e.g., FIGS. 2 and 3, bellows 108 further comprises second corrugated outboard ply 114. Corrugated outboard ply 112 is interposed between corrugated inboard ply 110 and second corrugated outboard ply 114. Second corrugated outboard ply 114 is hermetically coupled to first inner collar portion 106 by second weld 134 and is hermetically coupled to second inner collar portion 107 by fourth weld 184. Low-friction layer 189 of sheath 130 is in contact with second corrugated outboard ply 114 of bellows 108. The preceding subject matter of this paragraph characterizes example 24 of the present disclosure, wherein example 24 also includes the subject matter according to example 22 or 23, above.

Low-friction layer 189 of sheath 130, being in contact with second corrugated outboard ply 114, ensures that the outside diameter of sheath 130 is as small as possible for use in confined spaces.

Referring generally to FIG. 1A and particularly to, e.g., FIGS. 2 and 3, first sensor 116 is configured to detect a pressure change in interstitial space 126. The preceding subject matter of this paragraph characterizes example 25 of the present disclosure, wherein example 25 also includes the subject matter according to any one of examples 1 to 24, above.

First sensor 116, being configured to detect a pressure change in interstitial space 126, allows leakage of fluid from corrugated inboard ply 110 to be detected. Furthermore, in one or more examples, first sensor 116, being configured to detect a pressure change in interstitial space 126, is agnostic to the type of fluid transmitted through conduit 100 and leaking from corrugated inboard ply 110, which helps to increase the versatility of conduit 100.

Referring generally to FIG. 1A and particularly to, e.g., FIGS. 2 and 3, first sensor 116 is configured to detect a chemical change within interstitial space 126. The preceding subject matter of this paragraph characterizes example 26 of the present disclosure, wherein example 26 also includes the subject matter according to any one of examples 1 to 24, above.

First sensor 116, being configured to detect a change in chemical composition in interstitial space 126, allows leakage of fluid from corrugated inboard ply 110 to be detected. Furthermore, in one or more examples, first sensor 116, being configured to detect a change in chemical composition in interstitial space 126, is agnostic to the pressure of fluid transmitted through conduit 100 and pressure of fluid in interstitial space 126, which helps to increase the versatility of conduit 100.

Referring generally to FIGS. 1A and 1C and particularly to, e.g., FIG. 12, first sensor 116 comprises first chamber 190, containing first reactant 198. First sensor 116 further comprises second chamber 192, containing second reactant 199, isolated from first chamber 190, and communicatively coupled with interstitial space 126. First reactant 198 is identical to second reactant 199. The preceding subject matter of this paragraph characterizes example 27 of the present disclosure, wherein example 27 also includes the subject matter according to any one of examples 1 to 24 and 26, above.

First reactant 198, being the same as second reactant 199, facilitates contrasting visual conditions if first reactant 198 reacts with gas leaking into interstitial space 126. Because first reactant 198 and second reactant 199 are the same, the contrasting visual conditions occur despite changes in lighting conditions or discoloration of first reactant 198 and second reactant 199 due to time or atmospheric conditions. Contrasting visual conditions is enhanced by configuring first chamber 190 and second chamber 192 in a side-by-side configuration.

In some examples, first reactant 198 and second reactant 199 is palladium oxide, which is configured to react (e.g., discolor) in the presence of hydrogen. First sensor 116 further comprises permeable barrier 194 and impermeable barrier 196. Second chamber 192 is isolated from first chamber 190 by impermeable barrier 196, which is configured to prevent passage of first reactant 198 and second reactant 199 into second chamber 192 and first chamber 190, respectively, and to prevent passage of fluid into interstitial space 126 from second chamber 192 to first chamber 190. Permeable barrier 194 is configured to prevent passage of second reactant 199 from second chamber 192 to first channel 118 and interstitial space 126 and to allow passage of fluid, in interstitial space 126, from interstitial space 126 to second chamber 192.

Referring generally to FIG. 1A and particularly to, e.g., FIGS. 2 and 3, conduit 200 for transporting a fluid is disclosed. Conduit 200 comprises first collar 102 that comprises first outer collar portion 104 and first inner collar portion 106, threadably coupled with first outer collar portion 104. Conduit 200 also comprises bellows 108 that comprises central axis 180, corrugated outboard ply 112, corrugated inboard ply 110, interposed between corrugated outboard ply 112 and central axis 180, and interstitial space 126, interposed between corrugated inboard ply 110 and corrugated outboard ply 112. Conduit 200 further comprises first weld 138, hermetically coupling corrugated inboard ply 110 and first outer collar portion 104. Conduit 200 additionally comprises second weld 134, hermetically coupling corrugated outboard ply 112 and first inner collar portion 106. Conduit 200 also comprises first sensor 116, communicatively coupled with interstitial space 126. The preceding subject matter of this paragraph characterizes example 28 of the present disclosure.

Conduit 200 provides a compliant structure for transmission of fluids, such as cryogenic fuels, that accommodates displacements encountered during operation. First sensor 116, being communicatively coupled with interstitial space 126, allows first sensor 116 to monitor conditions within interstitial space 126. In particular, first sensor 116 enables detection of leaks in corrugated inboard ply 110 by detecting changes in conditions within interstitial space 126. First weld 138 promotes a strong, reliable, and sealed connection between corrugated inboard ply 110 and first outer collar portion 104. Second weld 134 promotes a strong, reliable, and sealed connection between corrugated outboard ply 112 and first inner collar portion 106. Communicatively coupling interstitial space 126 with first sensor 116 allows leaks of fluid or gas into interstitial space 126 through corrugated inboard ply 110 to be detected at a location, external to first collar 102.

Referring generally to FIGS. 13A-13E and particularly to, e.g., FIGS. 4-12, method 300 of fabricating conduit 100, 200 is disclosed. Method 300 comprises (block 202) attaching first tubular-outboard-ply end 149 of tubular outboard ply 113 to first inner collar portion 106 of first collar 102 with second weld 134. Method 300 also comprises (block 204) attaching second tubular-outboard-ply end 147 of tubular outboard ply 113, which is axially opposite first tubular-outboard-ply end 149 of tubular outboard ply 113, to second inner collar portion 107 of second collar 103 with fourth weld 184. Method 300 further comprises (block 206) inserting tubular inboard ply 111 into tubular outboard ply 113 and advancing tubular inboard ply 111 along an interior of tubular outboard ply 113 until first tubular-inboard-ply end 157 of tubular inboard ply 111 protrudes first distance D1 past first inner collar portion 106, and second tubular-inboard-ply end 159 protrudes second distance D2 past second inner collar portion 107. First distance D1 is greater than first predetermined distance PD1 and second distance D2 is greater than second predetermined distance PD1. Method 300 additionally comprises (block 208) simultaneously corrugating tubular inboard ply 111 and tubular outboard ply 113 to form bellows 108, having central axis 180 and comprising corrugated outboard ply 112, corrugated inboard ply 110, and interstitial space 126, interposed between corrugated inboard ply 110 and corrugated outboard ply 112. Corrugated outboard ply 112 is formed from tubular outboard ply 113, and corrugated inboard ply 110 is formed from tubular inboard ply 111. Method 300 also comprises (block 210) trimming first corrugated-inboard-ply end 151 of corrugated inboard ply 110, corresponding to first tubular-inboard-ply end 157 of tubular inboard ply 111, to create trimmed first corrugated-inboard-ply end 156 that protrudes first predetermined distance PD1 past first inner collar portion 106. Method 300 further comprises (block 212) trimming second corrugated-inboard-ply end 153 of corrugated inboard ply 110, corresponding to second tubular-inboard-ply end 159 of tubular inboard ply 111, to create trimmed second corrugated-inboard-ply end 170 that protrudes second predetermined distance PD2 past second inner collar portion 107. Method 300 additionally comprises (block 214) threadably interconnecting first inner collar portion 106 and first outer collar portion 104 of first collar 102. Method 300 also comprises (block 216) threadably interconnecting second inner collar portion 107 and second outer collar portion 105 of second collar 103. Method 300 further comprises (block 218) attaching trimmed first corrugated-inboard-ply end 156 of corrugated inboard ply 110 to first outer collar portion 104 with first weld 138. Method 300 additionally comprises (block 220) attaching trimmed second corrugated-inboard-ply end 170 of corrugated inboard ply 110 to second outer collar portion 105 with third weld 186. Method 300 also comprises (block 222) communicatively coupling first sensor 116 with interstitial space 126. The preceding subject matter of this paragraph characterizes example 29 of the present disclosure.

Method 300 facilitates fabrication of conduit 100 in an efficient and simple manner. Conduit 100 provides a compliant structure for transmission of fluids, such as cryogenic fuels, that accommodates displacements encountered during operation. First sensor 116, being communicatively coupled with interstitial space 126, allows first sensor 116 to monitor conditions within interstitial space 126. The threadable interconnection between first outer collar portion 104 and first inner collar portion 106 facilitates hermetical coupling of first outer collar portion 104 and first inner collar portion 106 while allowing first outer collar portion 104 to be separately formed from and interconnected to first inner collar portion 106, which enables bellows 108 to be hermetically coupled to first collar 102 in a simple and efficient manner. Similarly, the threadable interconnection between second outer collar portion 105 and second inner collar portion 107 facilitates hermetical coupling of second outer collar portion 105 and second inner collar portion 107 while allowing second outer collar portion 105 to be separately formed from and interconnected to second inner collar portion 107, which enables bellows 108 to be hermetically coupled to second collar 103 in a simple and efficient manner. First weld 138 promotes a strong, reliable, and sealed connection between corrugated inboard ply 110 and first outer collar portion 104. Second weld 134 promotes a strong, reliable, and sealed connection between corrugated outboard ply 112 and first inner collar portion 106. Third weld 186 promotes a strong, reliable, and sealed connection between corrugated inboard ply 110 and second outer collar portion 105. Fourth weld 184 promotes a strong, reliable, and sealed connection between corrugated outboard ply 112 and second inner collar portion 107. Advancing tubular inboard ply 111 along an interior of tubular outboard ply 113 until first tubular-inboard-ply end 157 of tubular inboard ply 111 protrudes first distance D1 past first inner collar portion 106, and second tubular-inboard-ply end 159 protrudes second distance D2 past second inner collar portion 107 accommodates the reduction in the length of tubular inboard ply 111 after tubular inboard ply 111 is corrugated. Simultaneously corrugating tubular outboard ply 113 and tubular inboard ply 111 to form bellows 108 promotes corrugations 158 in corrugated inboard ply 110 and corrugated outboard ply 112 of bellows 108 that are complementary to each other. Trimming first corrugated-inboard-ply end 151 of corrugated inboard ply 110 and trimming second corrugated-inboard-ply end 153 of corrugated inboard ply 110 promotes achieving a desired length of corrugated inboard ply 110 after corrugation of tubular inboard ply 111. Communicatively coupling interstitial space 126 with first sensor 116 allows leaks of fluid or gas into interstitial space 126 through corrugated inboard ply 110 to be detected at a location, external to first collar 102 and second collar 103.

After corrugating tubular outboard ply 113, first tubular-outboard-ply end 149 of tubular outboard ply 113 becomes first corrugated-outboard-ply end 146 of corrugated outboard ply 112 and second tubular-outboard-ply end 147 of tubular outboard ply 113 becomes second corrugated-outboard-ply end 171 of corrugated outboard ply 112.

Figure 13A:
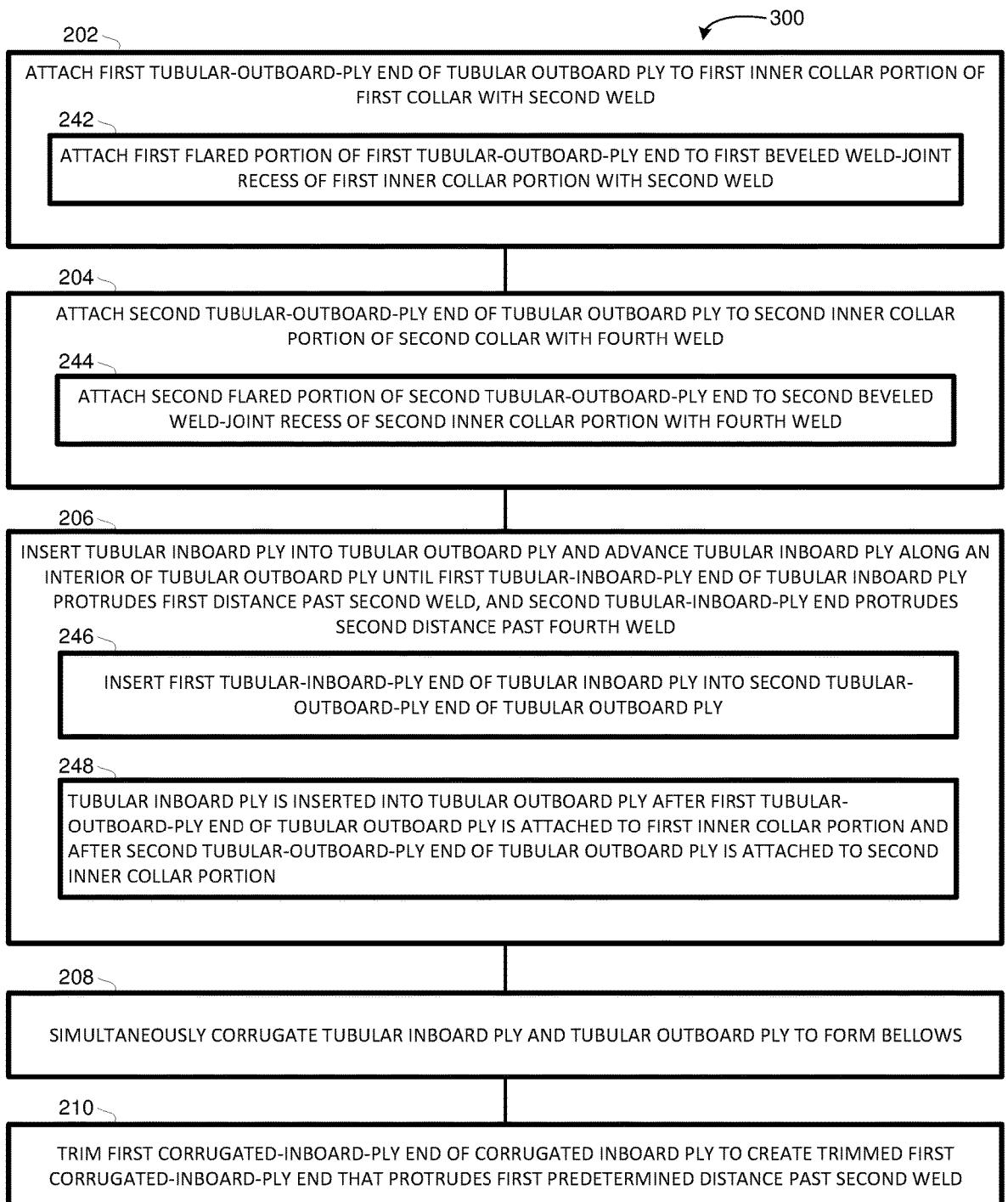

Referring generally to FIG. 13A and particularly to, e.g., FIG. 6, according to method 300, (block 206) inserting tubular inboard ply 111 into tubular outboard ply 113 comprises (block 246) inserting first tubular-inboard-ply end 157 of tubular inboard ply 111 into second tubular-outboard-ply end 147 of tubular outboard ply 113. The preceding subject matter of this paragraph characterizes example 30 of the present disclosure, wherein example 30 also includes the subject matter according to example 29, above.

Inserting first tubular-inboard-ply end 157 of tubular inboard ply 111 into second tubular-outboard-ply end 147 of tubular outboard ply 113 allows first tubular-inboard-ply end 157 to be positioned first distance D1 past first inner collar portion 106 in an efficient manner.

Figure 13B:
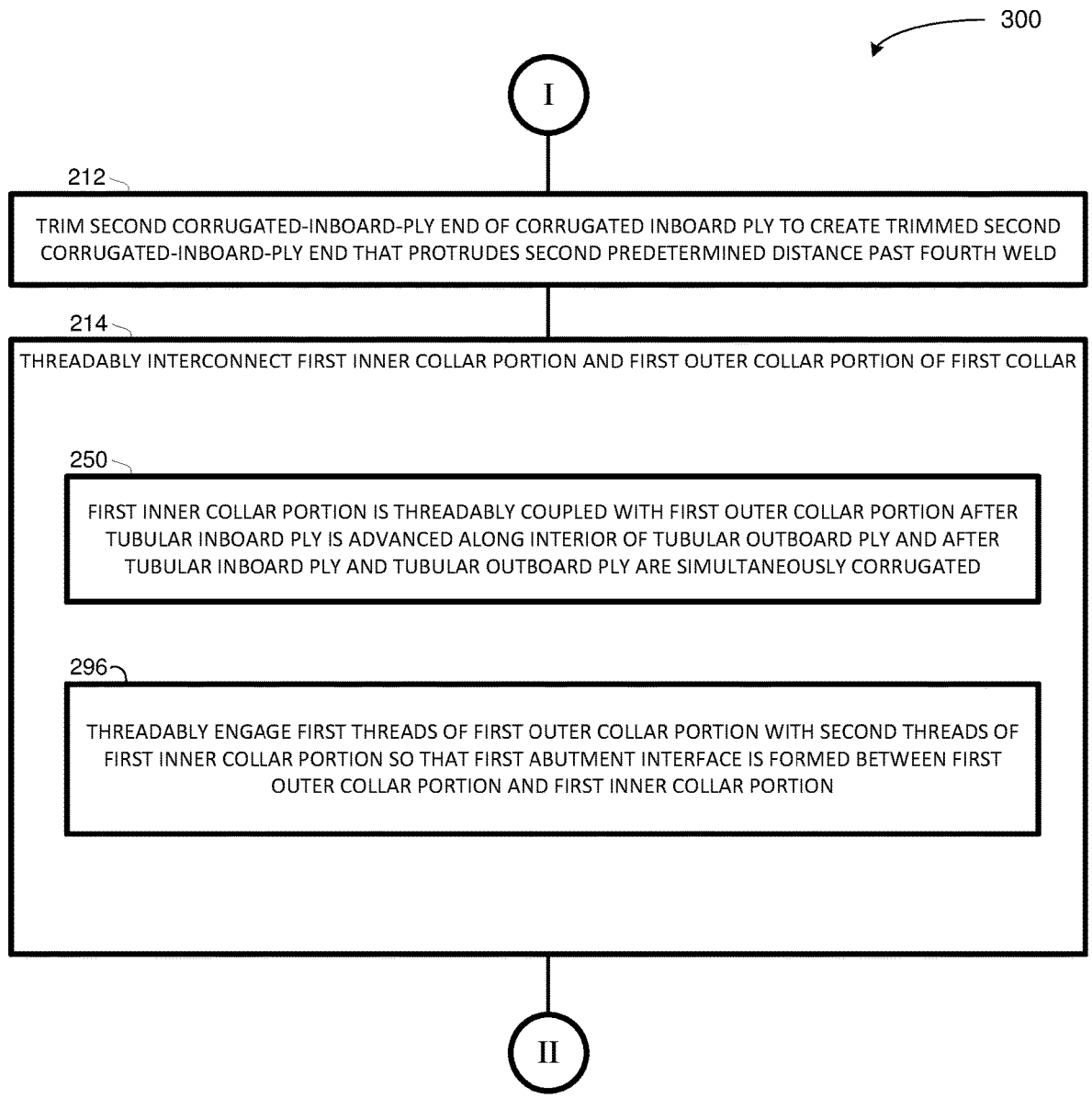

Referring generally to FIGS. 13B and 13C and particularly to, e.g., FIGS. 6-8 and 11, according to method 300, (block 250) first inner collar portion 106 is threadably coupled with first outer collar portion 104 and (block 258) second inner collar portion 107 is threadably coupled with second outer collar portion 105 after tubular inboard ply 111 is advanced along interior of tubular outboard ply 113 and after tubular inboard ply 111 and tubular outboard ply 113 are simultaneously corrugated. The preceding subject matter of this paragraph characterizes example 31 of the present disclosure, wherein example 31 also includes the subject matter according to example 29 or 30, above.

Threadably interconnecting first inner collar portion 106 with first outer collar portion 104 and threadably interconnecting second inner collar portion 107 with second outer collar portion 105, after tubular inboard ply 111 is advanced along interior of tubular outboard ply 113 and after tubular inboard ply 111 and tubular outboard ply 113 are simultaneously corrugated, promotes ease in trimming first corrugated-inboard-ply end 151 and second corrugated-inboard-ply end 153 to create trimmed first corrugated-inboard-ply end 156 and trimmed second corrugated-inboard-ply end 170, as it is possible to position first outer collar portion 104 and second outer collar portion 105 away from and out of the way of first inner collar portion 106 and second inner collar portion 107 during the trimming operations.

Referring generally to FIG. 13A and particularly to, e.g., FIGS. 5-7, according to method 300, (block 248) tubular inboard ply 111 is inserted into tubular outboard ply 113 after first tubular-outboard-ply end 149 of tubular outboard ply 113 is attached to first inner collar portion 106 and after second tubular-outboard-ply end 147 of tubular outboard ply 113 is attached to second inner collar portion 107. The preceding subject matter of this paragraph characterizes example 32 of the present disclosure, wherein example 32 also includes the subject matter according to example 31, above.

Inserting tubular inboard ply 111 into tubular outboard ply 113 after first tubular-outboard-ply end 149 of tubular outboard ply 113 is attached to first inner collar portion 106 and after second tubular-outboard-ply end 147 of tubular outboard ply 113 is attached to second inner collar portion 107 promotes ease in welding first tubular-outboard-ply end 149 to first inner collar portion 106 and welding second tubular-outboard-ply end 147 to second inner collar portion 107 by reducing obstructions to the welding site.

Figure 13D:
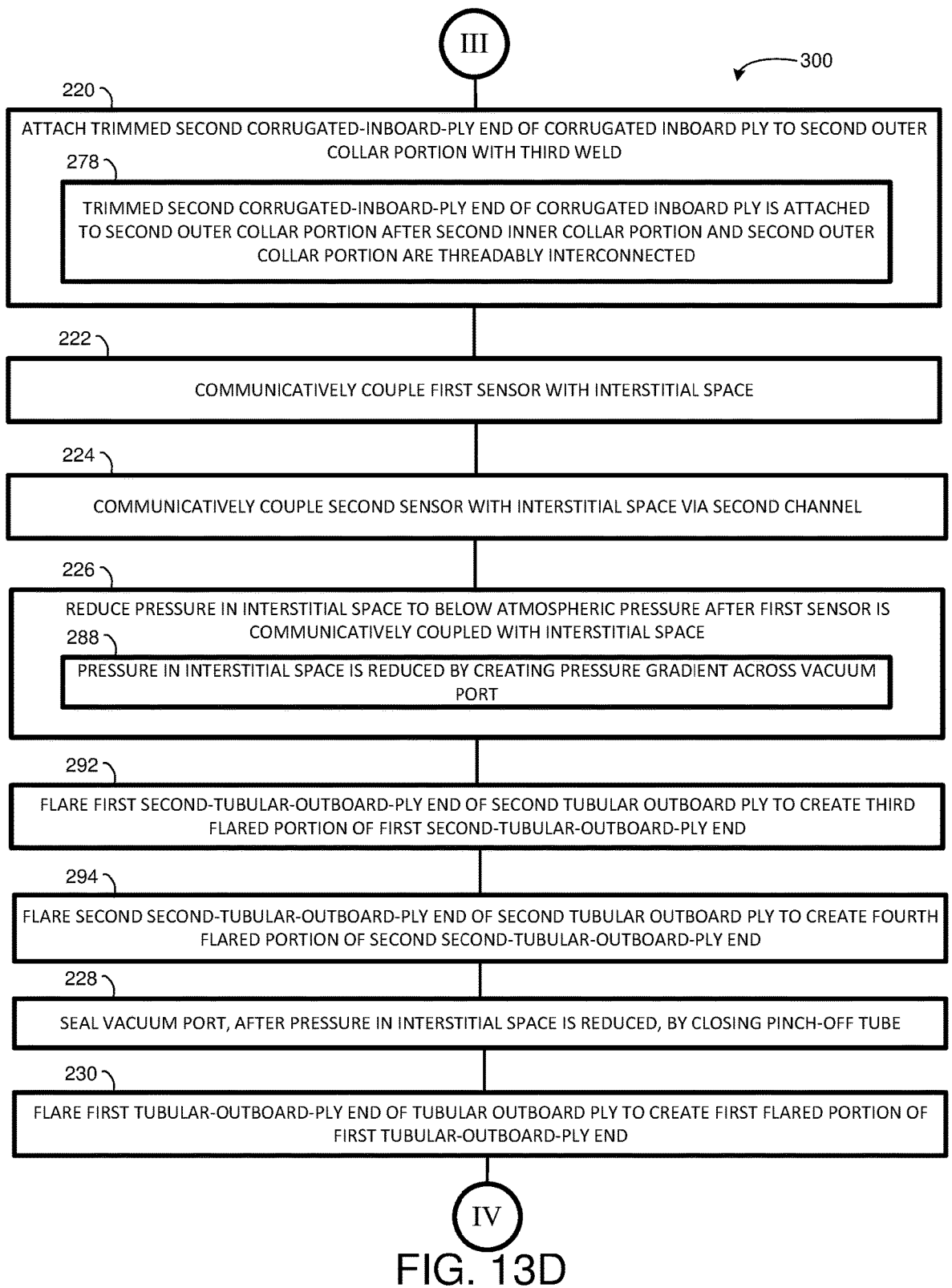

Referring generally to FIGS. 13C and 13D and particularly to, e.g., FIGS. 11 and 12, according to method 300, (block 266) trimmed first corrugated-inboard-ply end 156 of corrugated inboard ply 110 is attached to first outer collar portion 104 after first inner collar portion 106 and first outer collar portion 104 are threadably interconnected. Trimmed second corrugated-inboard-ply end 170 of corrugated inboard ply 110 is attached to second outer collar portion 105 after second inner collar portion 107 and second outer collar portion 105 are threadably interconnected. The preceding subject matter of this paragraph characterizes example 33 of the present disclosure, wherein example 33 also includes the subject matter according to example 32, above.

Attaching trimmed first corrugated-inboard-ply end 156 of corrugated inboard ply 110 to first outer collar portion 104 after first inner collar portion 106 and first outer collar portion 104 are threadably interconnected, and attaching trimmed second corrugated-inboard-ply end 170 of corrugated inboard ply 110 to second outer collar portion 105 after second inner collar portion 107 and second outer collar portion 105 are threadably interconnected allows first outer collar portion 104 and second outer collar portion 105 to be properly positioned to receive trimmed first corrugated-inboard-ply end 156 and trimmed second corrugated-inboard-ply end 170, respectively.

Referring generally to FIG. 13D and particularly to, e.g., FIGS. 2, 3, and 12, according to method 300, first sensor 116 is communicatively coupled with interstitial space 126 via first channel 118, passing through one of first inner collar portion 106 or first outer collar portion 104. First channel 118 is cross-sectionally circumferentially closed. The preceding subject matter of this paragraph characterizes example 34 of the present disclosure, wherein example 34 also includes the subject matter according to any one of examples 29 to 33, above.

Communicatively coupling interstitial space 126 with first sensor 116, via first channel 118 passing through one of first outer collar portion 104 or first inner collar portion 106, allows leaks of fluid or gas into interstitial space 126 through corrugated inboard ply 110 to be detected at any of various locations external to first collar 102, which helps to simplify the assembly and design of first collar 102 of conduit 100.

Referring generally to FIG. 13D and particularly to, e.g., FIG. 3, method 300 further comprises (block 224) communicatively coupling second sensor 117 with interstitial space 126 via second channel 119, passing through one of second inner collar portion 107 or second outer collar portion 105. Second channel 119 is cross-sectionally circumferentially closed. The preceding subject matter of this paragraph characterizes example 35 of the present disclosure, wherein example 35 also includes the subject matter according to example 34, above.

Communicatively coupling interstitial space 126 with second sensor 117, via second channel 119 passing through one of second outer collar portion 105 or second inner collar portion 107, allows leaks of fluid or gas into interstitial space 126 through corrugated inboard ply 110 to be detected at any of various locations external to second collar 103, which helps to simplify the assembly and design of second collar 103 of conduit 100. Additionally, second sensor 117, being communicatively coupled with interstitial space 126 along with first sensor 116, promotes redundant detection of leakage through corrugated inboard ply 110. In one or more examples, second sensor 117 is able to detect a change in pressure or chemical composition in interstitial space 126 that is not detectable by first sensor 116 for various reasons, such as, for example, when fluid, leaking through corrugated inboard ply 110, does not reach first sensor 116 or when first sensor 116 is disabled.

Referring generally to FIG. 13D and particularly to, e.g., FIG. 12, method 300 further comprises (block 226) reducing pressure in interstitial space 126 to below atmospheric pressure after first sensor 116 is communicatively coupled with interstitial space 126. The preceding subject matter of this paragraph characterizes example 36 of the present disclosure, wherein example 36 also includes the subject matter according to any one of examples 29 to 35, above.

Reducing pressure in interstitial space 126 to below atmospheric pressure ensures pressure in interstitial space 126 is not excessive when conduit 100 is used in space.

Referring generally to FIG. 13D and particularly to, e.g., FIG. 12, according to method 300, (block 288) pressure in interstitial space 126 is reduced by creating a pressure gradient across vacuum port 120, communicatively coupled with interstitial space 126. The preceding subject matter of this paragraph characterizes example 37 of the present disclosure, wherein example 37 also includes the subject matter according to example 36, above.

Vacuum port 120 enables pressure in interstitial space 126 to be reduced from location external to first collar 102 after first sensor 116 is communicatively coupled with interstitial space 126. Pressure gradient across vacuum port 120 is created by communicatively coupling pump 197 to vacuum port 120.

Referring generally to FIG. 13D and particularly to, e.g., FIGS. 2, 3, and 12, method 300 further comprises (block 228) sealing vacuum port 120, after pressure in interstitial space 126 is reduced, by closing pinch-off tube 140. The preceding subject matter of this paragraph characterizes example 38 of the present disclosure, wherein example 38 also includes the subject matter according to example 37, above.

Pinch-off tube 140 provides quick and easy sealing of vacuum port 120 after pressure is reduced. Pump 197 is communicatively coupled to vacuum port 120 by pinch-off tube 140.

In some examples, pinch-off tube 140 has a sufficient length that is conducive to multiple pressure-reduction and closing operations.

Referring generally to FIGS. 13A and 13D and particularly to, e.g., FIGS. 4 and 5, method 300 further comprises (block 230) flaring first tubular-outboard-ply end 149 of tubular outboard ply 113 to create first flared portion 148 of first tubular-outboard-ply end 149. According to method 300, (block 202) attaching first tubular-outboard-ply end 149 of tubular outboard ply 113 to first inner collar portion 106 comprises (block 242) attaching first flared portion 148 of first tubular-outboard-ply end 149 to first beveled weld-joint recess 144 of first inner collar portion 106 with second weld 134. Method 300 also comprises (block 232) flaring second tubular-outboard-ply end 147 of tubular outboard ply 113 to create second flared portion 181 of second tubular-outboard-ply end 147. According to method 300, (block 204) attaching second tubular-outboard-ply end 147 of tubular outboard ply 113 to second inner collar portion 107 comprises (block 244) attaching second flared portion 181 of second tubular-outboard-ply end 147 to second beveled weld-joint recess 161 of second inner collar portion 107 with fourth weld 184. The preceding subject matter of this paragraph characterizes example 39 of the present disclosure, wherein example 39 also includes the subject matter according to any one of examples 29 to 38, above.

Flaring first tubular-outboard-ply end 149 of tubular outboard ply 113 to create first flared portion 148 of first tubular-outboard-ply end 149 and attaching first flared portion 148 of first tubular-outboard-ply end 149 to first beveled weld-joint recess 144 of first inner collar portion 106 with second weld 134 helps to weld first tubular-outboard-ply end 149 to first inner collar portion 106 without second weld 134 obstructing interstitial space 126 or obstructing insertion of tubular inboard ply 111 into tubular outboard ply 113. Flaring second tubular-outboard-ply end 147 of tubular outboard ply 113 to create second flared portion 181 of second tubular-outboard-ply end 147 and attaching second flared portion 181 of second tubular-outboard-ply end 147 to second beveled weld-joint recess 161 of second inner collar portion 107 with fourth weld 184 helps to weld second tubular-outboard-ply end 147 to second inner collar portion 107 without fourth weld 184 obstructing interstitial space 126 or obstructing insertion of tubular inboard ply 111 into tubular outboard ply 113.

Figure 13E:
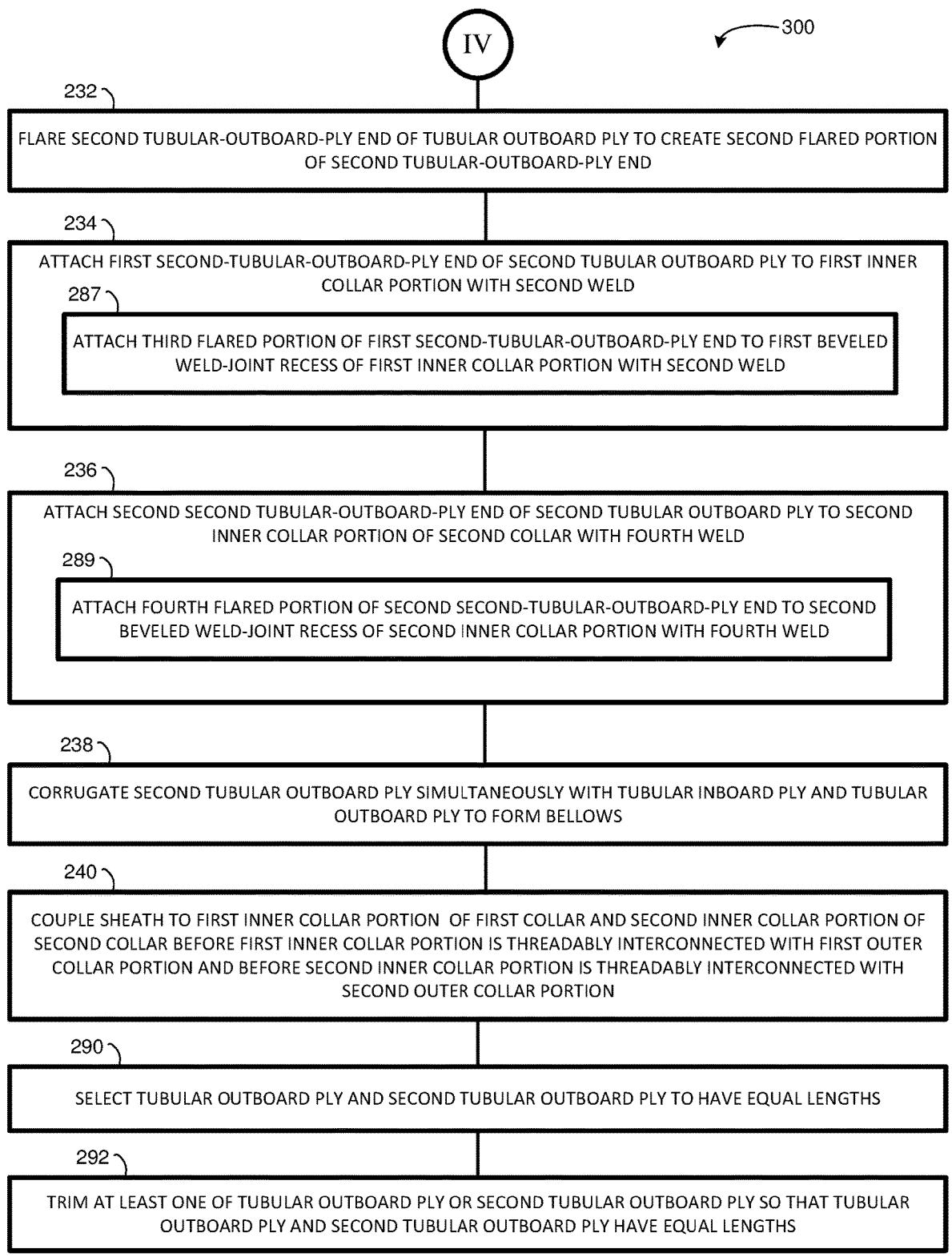

Referring generally to FIG. 13E and particularly to, e.g., FIGS. 5 and 8, method 300 further comprises (block 234) attaching first second-tubular-outboard-ply end 174 of second tubular outboard ply 115 to first inner collar portion 106 with second weld 134. Method 300 also comprises (block 236) attaching second second-tubular-outboard-ply end 176 of second tubular outboard ply 115, which is axially opposite first second-tubular-outboard-ply end 174 of second tubular outboard ply 115, to second inner collar portion 107 of second collar 103 with fourth weld 184. Method 300 additionally comprises (block 238) corrugating second tubular outboard ply 115 simultaneously with tubular inboard ply 111 and tubular outboard ply 113 to form bellows 108, which further comprises second corrugated outboard ply 114. Tubular outboard ply 113 is interposed between tubular inboard ply 111 and second tubular outboard ply 115. Second corrugated outboard ply 114 is formed from second tubular outboard ply 115. The preceding subject matter of this paragraph characterizes example 40 of the present disclosure, wherein example 40 also includes the subject matter according to any one of examples 29 to 39, above.

Second corrugated outboard ply 114 provides a redundant outboard ply, which promotes fault tolerance of conduit 100 by enabling conduit 100 to continue to operate if corrugated outboard ply 112 fails. Additionally, second corrugated outboard ply 114 protects corrugated outboard ply 112 from abrasions caused by objects outboard of corrugated outboard ply 112, such as sheath 130.

After corrugating second tubular outboard ply 115, first second-tubular-outboard-ply end 174 of second tubular outboard ply 115 becomes first second-corrugated-outboard-ply end 172 of second corrugated outboard ply 114 and second second-tubular-outboard-ply end 176 of second tubular outboard ply 115 becomes second second-corrugated-outboard-ply end 177 of second corrugated outboard ply 114.

In one or more examples, method 300 also comprises flaring first second-tubular-outboard-ply end 174 of second tubular outboard ply 115 to create third flared portion 178 of first second-tubular-outboard-ply end 174. Attaching first second-tubular-outboard-ply end 174 of second tubular outboard ply 115 to first inner collar portion 106 comprises attaching third flared portion 178 to first beveled weld-joint recess 144 with second weld 134. Method 300 additionally comprises flaring second second-tubular-outboard-ply end 176 of second tubular outboard ply 115 to create fourth flared portion 182 of second tubular outboard ply 115. Attaching second second-tubular-outboard-ply end 176 of second tubular outboard ply 115 to second inner collar portion 107 comprises attaching fourth flared portion 182 to second beveled weld-joint recess 161 with fourth weld 184.

Referring generally to FIG. 13E and particularly to, e.g., FIG. 4, method 300 further comprises one of (block 290) selecting tubular outboard ply 113 and second tubular outboard ply 115 to have equal lengths, or (block 292) trimming at least one of tubular outboard ply 113 or second tubular outboard ply 115 so that tubular outboard ply 113 and second tubular outboard ply 115 have equal lengths. The preceding subject matter of this paragraph characterizes example 41 of the present disclosure, wherein example 41 also includes the subject matter according to example 40, above.

Tubular outboard ply 113 and second tubular outboard ply 115, having equal lengths, enables tubular outboard ply 113 and second tubular outboard ply 115 to be attached to first collar 102 by a single weld and enables tubular outboard ply 113 and second tubular outboard ply 115 to be attached to second collar 103 by a single weld.

Referring generally to FIGS. 13D and 13E and particularly to, e.g., FIGS. 4 and 5, method 300 further comprises (block 292) flaring first second-tubular-outboard-ply end 174 of second tubular outboard ply 115 to create third flared portion 178 of first second-tubular-outboard-ply end 174. According to method 300, (block 234) attaching first second-tubular-outboard-ply end 174 of second tubular outboard ply 115 to first inner collar portion 106 comprises (block 287) attaching third flared portion 178 of first second-tubular-outboard-ply end 174 to first beveled weld-joint recess 144 of first inner collar portion 106 with second weld 134. Method 300 also comprises (block 294) flaring second second-tubular-outboard-ply end 176 of second tubular outboard ply 115 to create fourth flared portion 182 of second second-tubular-outboard-ply end 176. According to method 300, (block 236) attaching second second-tubular-outboard-ply end 176 of second tubular outboard ply 115 to second inner collar portion 107 comprises (block 289) attaching fourth flared portion 182 of second second-tubular-outboard-ply end 176 to second beveled weld-joint recess 161 of second inner collar portion 107 with fourth weld 184. The preceding subject matter of this paragraph characterizes example 42 of the present disclosure, wherein example 42 also includes the subject matter according to example 40 or 41, above.

Flaring first second tubular-outboard-ply end 174 of second tubular outboard ply 115 to create third flared portion 178 of first second-tubular-outboard-ply end 174 and attaching third flared portion 178 of first second-tubular-outboard-ply end 174 to first beveled weld-joint recess 144 of first inner collar portion 106 with second weld 134 helps to weld first second-tubular-outboard-ply end 174 to first inner collar portion 106 without second weld 134 obstructing interstitial space 126 or obstructing insertion of tubular inboard ply 111 into tubular outboard ply 113. Flaring second second-tubular-outboard-ply end 176 of second tubular outboard ply 115 to create fourth flared portion 182 of second second-tubular-outboard-ply end 176 and attaching fourth flared portion 182 of second second-tubular-outboard-ply end 176 to second beveled weld-joint recess 161 of second inner collar portion 107 with fourth weld 184 helps to weld second second-tubular-outboard-ply end 176 to second inner collar portion 107 without fourth weld 184 obstructing interstitial space 126 or obstructing insertion of tubular inboard ply 111 into tubular outboard ply 113.

Referring generally to FIGS. 13C and 13D and particularly to, e.g., FIGS. 10-12, according to method 300, first outer collar portion 104 of first collar 102 comprises first annular weld-joint recess 145. Second outer collar portion 105 of second collar 103 comprises second annular weld-joint recess 163. Trimmed first corrugated-inboard-ply end 156 of corrugated inboard ply 110 is attached to first annular weld-joint recess 145 of first outer collar portion 104 by first weld 138. Trimmed second corrugated-inboard-ply end 170 of corrugated inboard ply 110 is attached to second annular weld-joint recess 163 of second outer collar portion 105 by third weld 186 third weld 186. The preceding subject matter of this paragraph characterizes example 43 of the present disclosure, wherein example 43 also includes the subject matter according to any one of examples 29 to 42, above.

First annular weld-joint recess 145 helps to receive, retain, and align trimmed first corrugated-inboard-ply end 156 of corrugated inboard ply 110 for welding to first outer collar portion 104. Similarly, second annular weld-joint recess 163 helps to receive, retain, and align trimmed second corrugated-inboard-ply end 170 of corrugated inboard ply 110 for welding to second outer collar portion 105.

Referring generally to FIGS. 13B and 13C and particularly to, e.g., FIGS. 2, 3, and 10-12, according to method 300, (block 214) threadably interconnecting first inner collar portion 106 and first outer collar portion 104 of first collar 102 comprises (block 296) threadably engaging first threads 152 of first outer collar portion 104 with second threads 154 of first inner collar portion 106 so that first abutment interface 139 is formed between first outer collar portion 104 and first inner collar portion 106. According to method 300, (block 216) threadably interconnecting second inner collar portion 107 and second outer collar portion 105 of second collar 103 comprises (block 298) threadably engaging third threads 142 of second outer collar portion 105 with fourth threads 143 of second inner collar portion 107 so that second abutment interface 141 is formed between second outer collar portion 105 and second inner collar portion 107. The preceding subject matter of this paragraph characterizes example 44 of the present disclosure, wherein example 44 also includes the subject matter according to any one of examples 29 to 43, above.

Threadable engagement between first threads 152 and second threads 154 enables first outer collar portion 104 to be coupled to first inner collar portion 106 in a simple and efficient manner. Similarly, threadable engagement between third threads 142 and fourth threads 143 enables second outer collar portion 105 to be coupled to second inner collar portion 107 in a simple and efficient manner. First abutment interface 139 and second abutment interface 141 promote hermetical coupling of first outer collar portion 104 and first inner collar portion 106, and second outer collar portion 105 and second inner collar portion 107, respectively, at locations away from first threads 152 and second threads 154 and away from third threads 142 and fourth threads 143, which allows hermetical sealing of first outer collar portion 104 and first inner collar portion 106, and second outer collar portion 105 and second inner collar portion 107, to be performed separately from threadably engagement between first outer collar portion 104 and first inner collar portion 106, and second outer collar portion 105 and second inner collar portion 107.

Referring generally to FIG. 13C and particularly to, e.g., FIGS. 2, 3, 11, and 12, method 300 further comprises (block 280) hermetically sealing first abutment interface 139 between first outer collar portion 104 and first inner collar portion 106 with fifth weld 136. Method 300 additionally comprises (block 282) hermetically sealing second abutment interface 141 between second outer collar portion 105 and second inner collar portion 107 with sixth weld 137. The preceding subject matter of this paragraph characterizes example 45 of the present disclosure, wherein example 45 also includes the subject matter according to example 44, above.

Fifth weld 136 enables hermetical coupling of first outer collar portion 104 and first inner collar portion 106. Similarly, sixth weld 137 enables hermetical coupling of second outer collar portion 105 and second inner collar portion 107. First threads 152 and second threads 154 enable a strong mechanical coupling of first outer collar portion 104 and first inner collar portion 106, which allows fifth weld 136 to be configured primarily for hermetical coupling of first outer collar portion 104 and first inner collar portion 106. Accordingly, in one or more examples, fifth weld 136 is relatively smaller, or be of a different type of weld, than a weld for providing the sole mechanical coupling of first outer collar portion 104 and first inner collar portion 106. Third threads 142 and fourth threads 143 enable a strong mechanical coupling of plies to second outer collar portion 105 and second inner collar portion 107, which allows sixth weld 137 to be configured primarily for hermetical coupling of second outer collar portion 105 and second inner collar portion 107. Accordingly, in one or more examples, sixth weld 137 is relatively smaller, or be of a different type of weld, than a weld for providing the sole mechanical coupling of second outer collar portion 105 and second inner collar portion 107.

Referring generally to FIGS. 13B and 13C and particularly to, e.g., FIGS. 2 and 3, method 300 further comprises coupling sheath 130 to first inner collar portion 106 of first collar 102 and second inner collar portion 107 of second collar 103 before first abutment interface 139 is hermetically sealed with fifth weld 136 and before second abutment interface 141 is hermetically sealed with sixth weld 137. Corrugated outboard ply 112 is interposed between sheath 130 and central axis 180 of bellows 108. The preceding subject matter of this paragraph characterizes example 46 of the present disclosure, wherein example 46 also includes the subject matter according to example 45, above.

Sheath 130 helps to protect bellows 108 from external objects. Sheath 130 is slid over one of first inner collar portion 106 or second inner collar portion 107 into a position for coupling to first inner collar portion 106 and second inner collar portion 107. Coupling sheath 130 to first inner collar portion 106 of first collar 102 and second inner collar portion 107 of second collar 103 before first abutment interface 139 is hermetically sealed with fifth weld 136 and before second abutment interface 141 is hermetically sealed with sixth weld 137 enables sheath 130 to be positioned for coupling to first inner collar portion 106 and second inner collar portion 107 before fifth weld 136 and sixth weld 137 obstruct slidable access of sheath 130 to first inner collar portion 106 and second inner collar portion 107.

Referring generally to FIGS. 13C and 13D and particularly to, e.g., FIGS. 2 and 3, according to method 300, first weld 138 is offset from second weld 134 along central axis 180 of bellows 108. Third weld 186 is offset from fourth weld 184 along central axis 180 of bellows 108. The preceding subject matter of this paragraph characterizes example 47 of the present disclosure, wherein example 47 also includes the subject matter according to any one of examples 29 to 46, above.

First weld 138, being offset from second weld 134 along central axis 180 of bellows 108, helps to ensure first sensor 116 remains communicatively coupled with interstitial space 126 by ensuring first weld 138 is clear of second weld 134 in axial direction along central axis 180. Third weld 186, being offset from fourth weld 184 along central axis 180 of bellows 108, helps to ensure interstitial space 126 is open to second cavity 125 by ensuring third weld 186 is clear of fourth weld 184 in axial direction along central axis 180.

Referring generally to FIGS. 13C and 13D and particularly to, e.g., FIGS. 2 and 3, according to method 300, first weld 138 is offset from second weld 134 along an axis, perpendicular to central axis 180 of bellows 108, and is closer to central axis 180 than second weld 134. According to method 300, third weld 186 is offset from fourth weld 184 along an axis, perpendicular to central axis 180 of bellows 108, and is closer to central axis 180 than fourth weld 184. The preceding subject matter of this paragraph characterizes example 48 of the present disclosure, wherein example 48 also includes the subject matter according to any one of examples 29 to 47, above.

First weld 138, being offset from second weld 134 along an axis, perpendicular to central axis 180 of bellows 108, and being closer to central axis 180 than second weld 134 helps to ensure first sensor 116 remains communicatively coupled with interstitial space 126 by ensuring first weld 138 is clear of second weld 134 in radial direction relative to central axis 180. Third weld 186, being offset from fourth weld 184 along an axis, perpendicular to central axis 180 of bellows 108, and being closer to central axis 180 than fourth weld 184 helps to ensure interstitial space 126 is open to second cavity 125 by ensuring third weld 186 is clear of fourth weld 184 in radial direction relative to central axis 180.

Examples of the present disclosure may be described in the context of aircraft manufacturing and service method 1100 as shown in FIG. 14 and aircraft 1102 as shown in FIG. 15. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 15, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method (300) of fabricating a conduit (100), the method (300) comprising steps of:

attaching a first tubular-outboard-ply end (149) of a tubular outboard ply (113) to a first inner collar portion (106) of a first collar (102) with a second weld (134);

attaching a second tubular-outboard-ply end (147) of the tubular outboard ply (113), which is axially opposite the first tubular-outboard-ply end (149) of the tubular outboard ply (113), to a second inner collar portion (107) of a second collar (103) with a fourth weld (184);

inserting a tubular inboard ply (111) into the tubular outboard ply (113) and advancing the tubular inboard ply (111) along an interior of the tubular outboard ply (113) until a first tubular-inboard-ply end (157) of the tubular inboard ply (111) protrudes a first distance (D1) past the first inner collar portion (106), and a second tubular-inboard-ply end (159) protrudes a second distance (D2) past the second inner collar portion (107), and wherein the first distance (D1) is greater than a first predetermined distance (PD1) and the second distance (D2) is greater than a second predetermined distance (PD1);

simultaneously corrugating the tubular inboard ply (111) and the tubular outboard ply (113) to form a bellows (108), having a central axis (180) and comprising a corrugated outboard ply (112), a corrugated inboard ply (110), and an interstitial space (126), interposed between the corrugated inboard ply (110) and the corrugated outboard ply (112), and wherein the corrugated outboard ply (112) is formed from the tubular outboard ply (113), and the corrugated inboard ply (110) is formed from the tubular inboard ply (111);

trimming a first corrugated-inboard-ply end (151) of the corrugated inboard ply (110), corresponding to the first tubular-inboard-ply end (157) of the tubular inboard ply (111), to create a trimmed first corrugated-inboard-ply end (156) that protrudes the first predetermined distance (PD1) past the first inner collar portion (106);

trimming a second corrugated-inboard-ply end (153) of the corrugated inboard ply (110), corresponding to the second tubular-inboard-ply end (159) of the tubular inboard ply (111), to create a trimmed second corrugated-inboard-ply end (170) that protrudes the second predetermined distance (PD2) past the second inner collar portion (107);

threadably interconnecting the first inner collar portion (106) and a first outer collar portion (104) of the first collar (102);

threadably interconnecting the second inner collar portion (107) and a second outer collar portion (105) of the second collar (103);

attaching the trimmed first corrugated-inboard-ply end (156) of the corrugated inboard ply (110) to the first outer collar portion (104) with a first weld (138);

attaching the trimmed second corrugated-inboard-ply end (170) of the corrugated inboard ply (110) to the second outer collar portion (105) with a third weld (186); and communicatively coupling a first sensor (116) with the interstitial space (126).

2. The method (300) according to claim 1, wherein the step of inserting the tubular inboard ply (111) into the tubular outboard ply (113) comprises inserting the first tubular-inboard-ply end (157) of the tubular inboard ply (111) into the second tubular-outboard-ply end (147) of the tubular outboard ply (113).

3. The method (300) according to claim 1, wherein the first inner collar portion (106) is threadably coupled with the first outer collar portion (104) and the second inner collar portion (107) is threadably coupled with the second outer collar portion (105) after the tubular inboard ply (111) is advanced along the interior of the tubular outboard ply (113) and after the tubular inboard ply (111) and the tubular outboard ply (113) are simultaneously corrugated.

4. The method (300) according to claim 3, wherein the tubular inboard ply (111) is inserted into the tubular outboard ply (113) after the first tubular-outboard-ply end (149) of the tubular outboard ply (113) is attached to the first inner collar portion (106) and after the second tubular-outboard-ply end (147) of the tubular outboard ply (113) is attached to the second inner collar portion (107).

5. The method (300) according to claim 4, wherein:
the trimmed first corrugated-inboard-ply end (156) of the corrugated inboard ply (110) is attached to the first outer collar portion (104) after the first inner collar portion (106) and the first outer collar portion (104) are threadably interconnected; and
the trimmed second corrugated-inboard-ply end (170) of the corrugated inboard ply (110) is attached to the second outer collar portion (105) after the second inner collar portion (107) and the second outer collar portion (105) are threadably interconnected.

6. The method (300) according to claim 1, wherein:
the first sensor (116) is communicatively coupled with the interstitial space (126) via a first channel (118), passing through one of the first inner collar portion (106) or the first outer collar portion (104); and
the first channel (118) is cross-sectionally circumferentially closed.

7. The method (300) according to claim 6, further comprising communicatively coupling a second sensor (117) with the interstitial space (126) via a second channel (119), passing through one of the second inner collar portion (107) or the second outer collar portion (105), and wherein the second channel (119) is cross-sectionally circumferentially closed.

8. The method (300) according to claim 1, further comprising reducing pressure in the interstitial space (126) to below atmospheric pressure after the first sensor (116) is communicatively coupled with the interstitial space (126).

9. The method (300) according to claim 8, wherein the pressure in the interstitial space (126) is reduced by creating a pressure gradient across a vacuum port (120), communicatively coupled with the interstitial space (126).

10. The method (300) according to claim 9, further comprising sealing the vacuum port (120), after the pressure in the interstitial space (126) is reduced, by closing a pinch-off tube (140).

11. The method (300) according to claim 1, further comprising:
flaring the first tubular-outboard-ply end (149) of the tubular outboard ply (113) to create a first flared portion (148) of the first tubular-outboard-ply end (149), and wherein the step of attaching the first tubular-outboard-ply end (149) of the tubular outboard ply (113) to the first inner collar portion (106) comprises attaching the first flared portion (148) of the first tubular-outboard-ply end (149) to a first beveled weld-joint recess (144) of the first inner collar portion (106) with the second weld (134); and
flaring the second tubular-outboard-ply end (147) of the tubular outboard ply (113) to create a second flared portion (181) of the second tubular-outboard-ply end (147), and wherein the step of attaching the second tubular-outboard-ply end (147) of the tubular outboard ply (113) to the second inner collar portion (107) comprises attaching the second flared portion (181) of the second tubular-outboard-ply end (147) to a second beveled weld-joint recess (161) of the second inner collar portion (107) with the fourth weld (184).

12. The method (300) according to claim 1, further comprising:
attaching a first second-tubular-outboard-ply end (174) of a second tubular outboard ply (115) to the first inner collar portion (106) with the second weld (134);
attaching a second second-tubular-outboard-ply end (176) of the second tubular outboard ply (115), which is axially opposite the first second-tubular-outboard-ply end (174) of the second tubular outboard ply (115), to the second inner collar portion (107) of the second collar (103) with the fourth weld (184); and
corrugating the second tubular outboard ply (115) simultaneously with the tubular inboard ply (111) and the tubular outboard ply (113) to form the bellows (108), which further comprises a second corrugated outboard ply (114); and
wherein:
the tubular outboard ply (113) is interposed between the tubular inboard ply (111) and the second tubular outboard ply (115), and
the second corrugated outboard ply (114) is formed from the second tubular outboard ply (115).

13. The method (300) according to claim 12, further comprising one of:
selecting the tubular outboard ply (113) and the second tubular outboard ply (115) to have equal lengths; or
trimming at least one of the tubular outboard ply (113) or the second tubular outboard ply (115) so that the tubular outboard ply (113) and the second tubular outboard ply (115) have equal lengths.

14. The method (300) according to claim 12, further comprising:
flaring the first second-tubular-outboard-ply end (174) of the second tubular outboard ply (115) to create a third flared portion (178) of the first second-tubular-outboard-ply end (174), and wherein the step of attaching the first second-tubular-outboard-ply end (174) of the second tubular outboard ply (115) to the first inner collar portion (106) comprises attaching the third flared portion (178) of the first second-tubular-outboard-ply end (174) to a first beveled weld-joint recess (144) of the first inner collar portion (106) with the second weld (134); and
flaring the second second-tubular-outboard-ply end (176) of the second tubular outboard ply (115) to create a fourth flared portion (182) of the second second-tubular-outboard-ply end (176), and wherein the step of attaching the second second-tubular-outboard-ply end (176) of the second tubular outboard ply (115) to the second inner collar portion (107) comprises attaching the fourth flared portion (182) of the second second-tubular-outboard-ply end (176) to a second beveled weld-joint recess (161) of the second inner collar portion (107) with the fourth weld (184).

15. The method (300) according to claim 1, wherein:
the first outer collar portion (104) of the first collar (102) comprises a first annular weld-joint recess (145);
the second outer collar portion (105) of the second collar (103) comprises a second annular weld-joint recess (163);
the trimmed first corrugated-inboard-ply end (156) of the corrugated inboard ply (110) is attached to the first annular weld-joint recess (145) of the first outer collar portion (104) by the first weld (138); and
the trimmed second corrugated-inboard-ply end (170) of the corrugated inboard ply (110) is attached to the second annular weld-joint recess (163) of the second outer collar portion (105) by the third weld (186).

16. The method (300) according to claim 1, wherein:
the step of threadably interconnecting the first inner collar portion (106) and the first outer collar portion (104) of the first collar (102) comprises threadably engaging first threads (152) of the first outer collar portion (104) with second threads (154) of the first inner collar portion (106) so that a first abutment interface (139) is formed between the first outer collar portion (104) and the first inner collar portion (106); and
the step of threadably interconnecting the second inner collar portion (107) and the second outer collar portion (105) of the second collar (103) comprises threadably engaging third threads (142) of the second outer collar portion (105) with fourth threads (143) of the second inner collar portion (107) so that a second abutment interface (141) is formed between the second outer collar portion (105) and the second inner collar portion (107).

17. The method (300) according to claim 16, further comprising:
hermetically sealing the first abutment interface (139) between the first outer collar portion (104) and the first inner collar portion (106) with a fifth weld (136); and
hermetically sealing the second abutment interface (141) between the second outer collar portion (105) and the second inner collar portion (107) with a sixth weld (137).

18. The method (300) according to claim 17, further comprising coupling a sheath (130) to the first inner collar portion (106) of the first collar (102) and the second inner collar portion (107) of the second collar (103) before the first abutment interface (139) is hermetically sealed with the fifth weld (136) and before the second abutment interface (141) is hermetically sealed with the sixth weld (137), and wherein the corrugated outboard ply (112) is interposed between the sheath (130) and the central axis (180) of the bellows (108).

19. The method (300) according to claim 1, wherein:
the first weld (138) is offset from the second weld (134) along the central axis (180) of the bellows (108); and
the third weld (186) is offset from the fourth weld (184) along the central axis (180) of the bellows (108).

20. The method (300) according to claim 1, wherein:
the first weld (138) is offset from the second weld (134) along an axis, perpendicular to the central axis (180) of the bellows (108), and is closer to the central axis (180) than the second weld (134); and
the third weld (186) is offset from the fourth weld (184) along an axis, perpendicular to the central axis (180) of the bellows (108), and is closer to the central axis (180) than the fourth weld (184).

\* \* \* \* \*